(12) United States Patent
Hamada

(10) Patent No.: US 8,914,436 B2
(45) Date of Patent: Dec. 16, 2014

(54) DATA PROCESSING DEVICE AND DATA RETRIEVER

(75) Inventor: Kei Hamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 12/816,866

(22) Filed: Jun. 16, 2010

(65) Prior Publication Data

US 2010/0332592 A1 Dec. 30, 2010

(30) Foreign Application Priority Data

Jun. 25, 2009 (JP) ................. 2009-150780

(51) Int. Cl.
*G06F 15/16* (2006.01)
*H04L 29/12* (2006.01)
*H04L 29/06* (2006.01)
*H04L 29/08* (2006.01)

(52) U.S. Cl.
CPC ...... *H04L 29/12047* (2013.01); *H04L 29/1265* (2013.01); *H04L 29/12716* (2013.01); *H04L 61/15* (2013.01); *H04L 61/303* (2013.01); *H04L 61/3065* (2013.01); *H04L 69/22* (2013.01); *H04L 67/1008* (2013.01); *H04L 67/1002* (2013.01)
USPC ........... 709/203; 709/223; 709/224; 709/228; 709/238; 709/239; 709/244; 709/245

(58) Field of Classification Search
USPC ......... 709/203, 223, 224, 226, 228, 238, 239, 709/244, 245
See application file for complete search history.

(56) References Cited

U.S. PATENT DOCUMENTS

| | | | |
|---|---|---|---|
| 7,379,458 B2 | 5/2008 | Inoue et al. | |
| 7,509,424 B2 * | 3/2009 | Okazaki | 709/226 |
| 7,620,732 B2 * | 11/2009 | Ishihara et al. | 709/241 |
| 7,650,405 B2 * | 1/2010 | Hood et al. | 709/224 |
| 7,711,819 B2 * | 5/2010 | Ono et al. | 709/226 |
| 7,752,307 B2 * | 7/2010 | Takara | 709/224 |
| 2004/0098499 A1 | 5/2004 | Tamai | |
| 2005/0010668 A1 * | 1/2005 | Chen | 709/227 |
| 2009/0222533 A1 * | 9/2009 | Matsuoka et al. | 709/217 |
| 2009/0249131 A1 * | 10/2009 | Mitomo | 714/48 |
| 2010/0150158 A1 * | 6/2010 | Cathey et al. | 370/392 |
| 2010/0172294 A1 * | 7/2010 | Toyokawa | 370/328 |

FOREIGN PATENT DOCUMENTS

| | | |
|---|---|---|
| JP | 2000-138687 A | 5/2000 |
| JP | 2003-174473 A | 6/2003 |
| JP | 2004-158977 A | 6/2004 |

* cited by examiner

*Primary Examiner* — Rupal Dharia
*Assistant Examiner* — Van Kim T Nguyen
(74) *Attorney, Agent, or Firm* — Fujitsu Patent Center

(57) ABSTRACT

A data processing device includes a receiving means, a discriminating means, a data retriever determining means, and a transmitting means. The receiving means receives data transmitted from a client computer to one of plural server computers. The discriminating means extracts destination information and source information from the received data. The destination information is information on the one of the plural server computers. The source information is information on the client computer. The data retriever determining means determines a data retriever in accordance with the extracted information. The data retriever searches the one of the plural server computers. The transmitting means transmits the data together with the destination information and the source information to the determined data retriever.

8 Claims, 20 Drawing Sheets

```
                    ┌─381a
┌─────────────────────────┐
│                         │
│  F(x)=G(H(x)%N)         │
│  x=Identifier           │
│  H(x)=MD5               │
│  N=100                  │
│  G(x)=Table1            │
│                         │
└─────────────────────────┘
```

```
... protocol = 6 (tcp)  ...          ⟵ 111
... port = 8080  ...                 ⟵ 112

HTTP/1.1/services/A1\r\n             ⟵ 113
Cookie: JSESSIONID=55D95DFFF39788A6729C2F74018AA23C;\r\n
Content-Type: text/html;charset=ISO-8859-1\r\n
Content-Length: 1270\r\n
Date: Tue, 29 Jan 2008 12:38:25 GMT\r\n
Server: Apache-Coyote/1.1\r\n
Connection: Keep-Alive\r\n <?xml version="1.0"?>                ⟵ 114
<soapenv:Envelope>
<soapenv:Header>
...
</soapenv:Header>
<soapenv:Body>
<getUserPresence>
<From> user29876543 </From>
<Presentity> sip:bob@example.com </Presentity>
<Policy_Role> Manager </Policy_Role>
<Item>
...
</Item>
</getUserPresence>
</soapenv:Body>
</soapenv:Envelope>
```

```
··· protocol = 6 (tcp) ···                                              ⟵ 111
··· port = 8080 ···                                                     ⟵ 112
Destination-Application-Name: /services/A1                              ⟵ 115
Identifier: sip:bob@example.com
HTTP/1.1 /services/A1\r\n                                               ⟵ 113
Cookie: JSESSIONID=55D95DFFF39788A6729C2F74018AA23C;\r\n
Content-Type: text/html;charset=ISO-8859-1\r\n
Content-Length: 1270\r\n
Date: Tue, 29 Jan 2008 12:38:25 GMT\r\n
Server: Apache-Coyote/1.1\r\n
Connection: Keep-Alive\r\n
<?xml version="1.0"?>                                                   ⟵ 114
<soapenv:Envelope>
<soapenv:Header>
 ...
</soapenv:Header>
<soapenv:Body>
<getUserPresence>
<From> user29876543 </From>
<Presentity> sip:bob@example.com </Presentity>
<Policy_Role> Manager </Policy_Role>
<Item>
 ...
</Item>
</getUserPresence>
</soapenv:Body>
</soapenv:Envelope>
```

| PROTOCOL No. | PORT No. | MASSAGE FORMAT | EXTRACTION AREA | FORM OF EXTRACTION AREA |
|---|---|---|---|---|
| 6(tcp) | 8080 | HTTP | Request-URI | HTTP HEADER FIELD NAME |
| ... | | | | |

FIG. 8 — 371a

| DESTINATION APPLICATION NAME | MASSAGE FORMAT | EXTRACTION AREA | FORM OF EXTRACTION AREA |
|---|---|---|---|
| /services/A1 | SOAP | //presentity | Xpath |
| ... | | | |

Table1

| KEY VALUE | ADDRESS |
|---|---|
| 0 | 10.10.10.10:9999 |
| 1 | 10.10.10.11:9999 |
| ... | ... |
| 99 | 10.10.10.11:9999 |

F(x)=G(H(x)%N)
x=Identifier
H(x)=MD5
N=100
G(x)=Table1

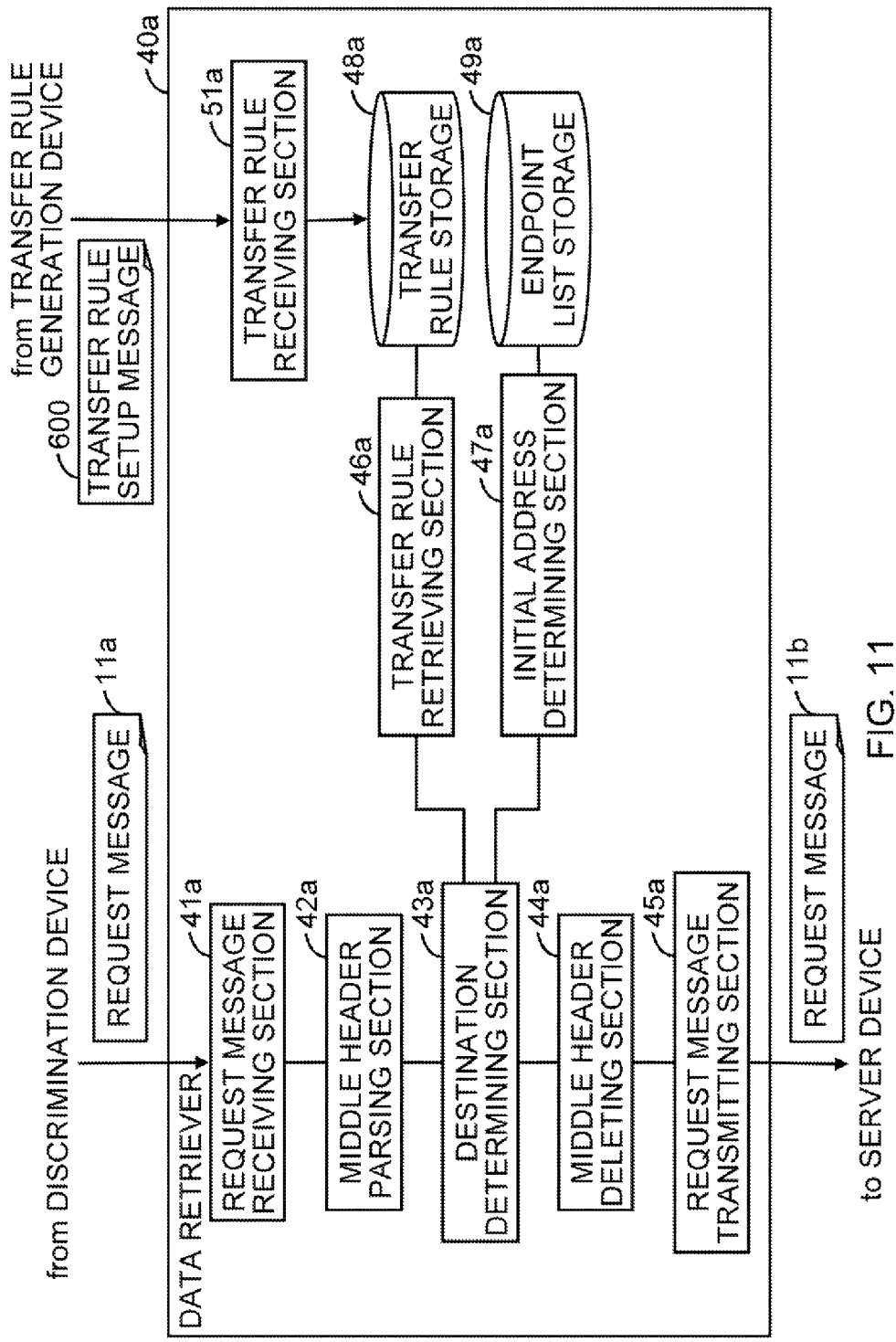

481a

| DESTINATION APPLICATION NAME | IDENTIFIER | DESTINATION ADDRESS |
|---|---|---|
| /services/A1 | sip:bob@example.com | host1.example.com:8080 |
| /services/A1 | def234@10.10.10.9 | host2.example.com:8080 |
| /services/A1 | sip:alice@example.com | host3.example.com:8080 |
| /services/B2 | sip:bob@example.com | host1.example.com:8080 |

| DESTINATION APPLICATION NAME | IDENTIFIER | DESTINATION ADDRESS |
|---|---|---|
| /services/A1 | aaaabbbb.1 | host1.example.com:8080 |
| /services/B2 | abcdefghi.5 | host5.example.com:8080 |
| /services/B2 | xyzzzzzyyx.4 | host4.example.com:8080 |

FIG. 13

| DESTINATION APPLICATION NAME | DESTINATION ADDRESS |
|---|---|
| /services/A1 | host1.example.com:8080 |
| /services/A1 | host2.example.com:8080 |
| /services/A1 | host3.example.com:8080 |
| /services/A1 | host4.example.com:8080 |
| /services/B2 | host1.example.com:8080 |
| /services/B2 | host2.example.com:8080 |
| /services/B2 | host3.example.com:8080 |
| /services/B2 | host4.example.com:8080 |
| /services/B2 | host5.example.com:8080 |

Table1 — 65a

| KEY VALUE | ADDRESS |
|---|---|
| 0 | 10.10.10.10:8888 |
| 1 | 10.10.10.11:8888 |
| ... | ... |
| 99 | 10.10.10.11:8888 |

| SERVER APPLICATION NAME | /services/A1 |
|---|---|
| IDENTIFIER | bob@example.com |
| SERVER ADDRESS | host1.example.com |

| DESTINATION APPLICATION NAME | /services/A1 |
|---|---|
| IDENTIFIER | bob@example.com |
| DESTINATION ADDRESS | host1.example.com:8080 |
| OPERATION | ADDITION |

FIG. 17

DATA PROCESSING DEVICE AND DATA RETRIEVER

CROSS-REFERENCE TO RELATED APPLICATION

This application is based upon and claims the benefit of priority of the prior Japanese Patent Application No. 2009-150780, filed on Jun. 25, 2009, the entire contents of which are incorporated herein by reference.

FIELD

The embodiments discussed herein are related to a data processing device and a data retriever.

BACKGROUND

Technologies using a simple object access protocol (SOAP) are known in the art to be employed to exchange messages between devices executing application programs in information technology (IT) systems or data centers of companies with widespread use of system architectures, such as a service oriented architecture (SOA).

The SOAP employs an extensible markup language (XML) to describe communication contents.

Relay devices are also known in the art to relay messages in exchanging the messages.

The relay devices relay messages exchanged between application programs in accordance with values contained in the messages.

For example, when distributing the loads for executing application programs, the relay devices may determine a destination server device in accordance with identifiers (IDs) or user names included in the messages to ensure uniqueness of distribution.

The relay devices sometimes increase in processing load because the relay devices need to identify (analyze) the values contained in the messages.

Technologies for reducing load per relay device are known in that a load balancer distributes loads on plural of relay devices.

SUMMARY

A data processing device includes a receiving means, a discriminating means, a data retriever determining means, and a transmitting means. The receiving means receives data transmitted from a client computer to one of plural server computers. The discriminating means extracts destination information and source information from the received data. The destination information is information on the one of the plural server computers. The source information is information on the client computer. The data retriever determining means determines a data retriever in accordance with the extracted information. The data retriever searches the one of the plural server computers. The transmitting means transmits the data together with the destination information and the source information to the determined data retriever.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a request message transmitted from a client device according to an embodiment of the present invention;

FIG. 6 is a diagram illustrating an example of a request message transmitted from a discrimination device according to an embodiment of the present invention;

FIG. 7 is a diagram illustrating an example of a destination application name rule according to an embodiment of the present invention;

FIG. 8 is a diagram illustrating an example of a discrimination rule according to an embodiment of the present invention;

FIG. 9 is a diagram illustrating an example of information stored in a function definition storage according to an embodiment of the present invention;

FIG. 10 is a diagram illustrating an example of a dependent table according to an embodiment of the present invention;

FIG. 11 is a diagram illustrating functions of a data retriever according to an embodiment of the present invention;

FIG. 12 is a diagram illustrating an example of a transfer rule stored in a data retriever according to an embodiment of the present invention;

FIG. 13 is a diagram illustrating an example of a transfer rule stored in a data retriever according to an embodiment of the present invention;

FIG. 14 is a diagram illustrating an example of an endpoint list stored in a data retriever according to an embodiment of the present invention;

FIG. 16 is a diagram illustrating an example of identifier information according to an embodiment of the present invention;

FIG. 17 is a diagram illustrating an example of a transfer rule setup message according to an embodiment of the present invention;

FIG. 18 is a diagram illustrating an example of a dependent table according to an embodiment of the present invention;

DESCRIPTION OF EMBODIMENTS

The load balancer determines relay devices to prevent loads from concentrating on one relay device. Therefore, each of the relay devices may hold an identical transfer rule table to enable search for the transfer rules upon receiving any message.

When each of the relay devices holds the identical transfer rule table, an amount of entries of the transfer rule table may be enormous.

It may cause a problem that the cost of searching for the transfer rules in each of the relay devices increases, thus disadvantageously reducing the processing performance.

When introducing hardware that may not degrade the processing performance with enormous entries of the transfer rule table, an installation cost would disadvantageously increase.

Thus, it is preferable to provide a device for processing data in which the processing performance may be maintained.

Embodiments of the present invention will be discussed below with reference to the drawings.

First, a data processing device according to an embodiment will be discussed, and thereafter, the embodiment will be discussed in detail.

Figure 1:
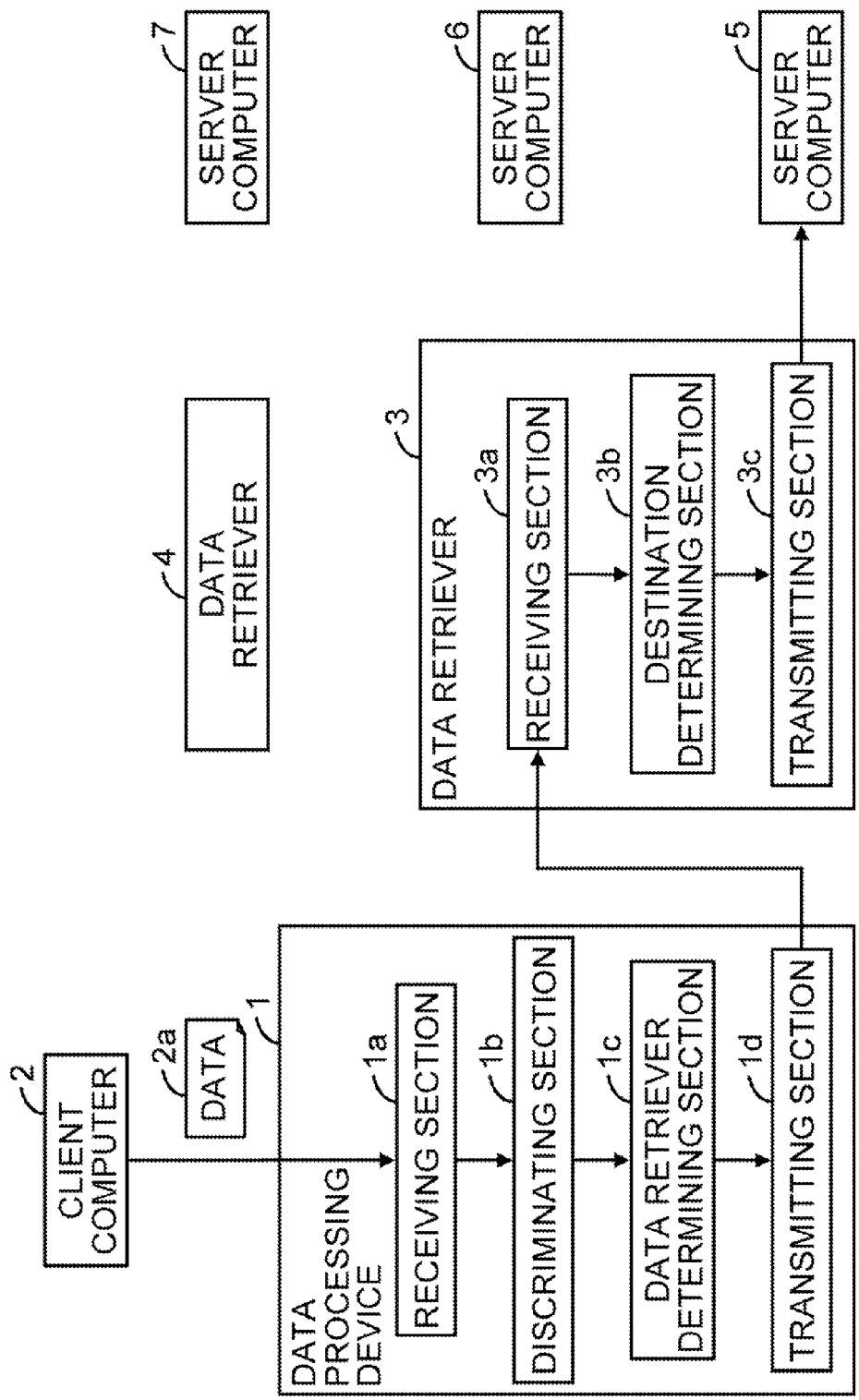
FIG. 1 is a diagram illustrating a system including a data processing device according to an embodiment of the present invention.

FIG. 1 is a diagram illustrating a system including a data processing device according to an embodiment of the present invention.

A data processing device 1 includes a receiving section 1a, a discriminating section 1b, a data retriever determining section 1c, and a transmitting section 1d.

The receiving section 1a receives data 2a transmitted from a client computer 2 to one of plural of server computers 5 to 7.

The discriminating section 1b extracts, from the data 2a received by the receiving section 1a, destination information that is information on the destination server computer 5, 6, or 7 and source information that is information on the source client computer 2.

Examples of the destination information include information (application name) capable of identifying a program executed by the server computer 5, 6, or 7.

Examples of the source information include information capable of identifying a user who operates the client computer 2.

Preferably, the destination information and the source information are added at a predetermined position in the data 2a. This allows a data retriever 3, discussed below, to identify easily a portion to be deleted when deleting the destination information and the source information.

The data retriever determining section 1c determines, in accordance with the information extracted by the discriminating section 1b, the data retriever 3 or a data retriever 4 for searching the destination server computer 5, 6, or 7.

A method for determining the data retriever is not particularly limited; for example, data having identical source information is transmitted to the same data retriever in accordance with predefined determination criteria. It is assumed that the data retriever 3 is selected.

The transmitting section 1d transmits the data 2a, the destination information, and the source information to the determined data retriever 3.

Such a data processing device 1 may reduce the processing loads on data retrievers 3 and 4 at the subsequent stages, thereby preventing degradation in processing performance.

The data retriever 3 includes a receiving section 3a, a destination determining section 3b, and a transmitting section 3c.

The receiving section 3a receives the data 2a transmitted from the client computer 2 to one of the server computers 5 to 7, the destination information, and the source information.

In the case where the destination information and the source information are added at the predetermined position in the data 2a, as discussed above, the data retriever 3 may easily obtain the destination information and the source information by referring to the predetermined position.

The destination determining section 3b determines a destination server computer in accordance with the destination information and the source information.

For example, the data retriever 3 may hold information indicating a relationship between the source information and a destination server computer corresponding thereto to determine a destination server computer in accordance with the held information.

The transmitting section 3c transmits the data 2a to the destination server computer.

In the case where the destination information and the source information are added at the predetermined position in the data 2a, it is preferable to remove the destination information and the source information from the predetermined position.

Thus, information unnecessary for the process of the server computer is not transmitted, thereby preventing the server computer from performing an unnecessary process.

Since the data retriever 3 receives the destination information and the source information necessary for determining the destination server computer, there is no need for the data retriever 3 to extract those information separately, thus reducing processing load.

Figure 2:
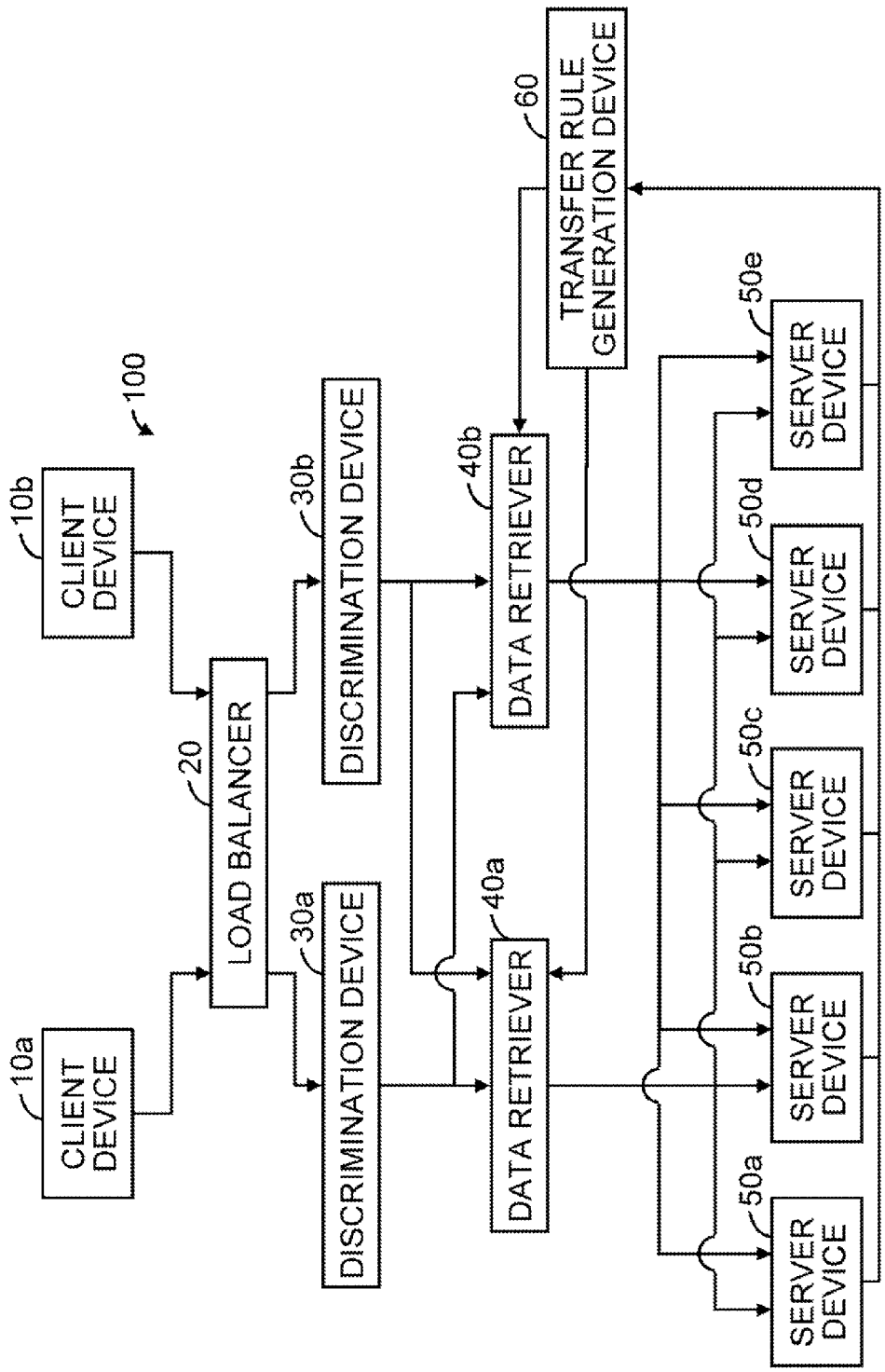
FIG. 2 is a diagram illustrating a system including a discrimination device as a data processing device according to an embodiment of the present invention.

FIG. 2 is a diagram illustrating a system including a discrimination device as a data processing device according to an embodiment of the present invention.

A system 100 includes client devices 10a and 10b, a load balancer 20, discrimination devices 30a and 30b, data retrievers 40a and 40b, server devices 50a to 50e, and a transfer rule generation device 60.

Each of the client devices 10a and 10b connects to the load balancer 20 via a network.

Each of the client devices 10a and 10b stores at least one application program (referred to as a client application program).

By executing the client application program, the client device 10a or 10b transmits a message (referred to as a request message) for requesting one of the server devices 50a to 50e to execute an application program (referred to as a server application program) stored in the one of the server devices 50a to 50e.

The server devices are virtualized by the discrimination devices 30a and 30b, the data retrievers 40a and 40b, and the load balancer 20.

Therefore, the request message transmitted from the client devices to the server devices includes a network address of the load balancer 20 as a destination address.

The load balancer 20 connects to the discrimination devices 30a and 30b via a network.

Upon receiving the request message from one of the client devices 10a and 10b, the load balancer 20 determines a destination discrimination device in accordance with loads on the discrimination devices 30a and 30b.

Upon receiving a response to the request message from one of the server devices 50a to 50e, the load balancer 20 returns the response to the client device 10a or 10b that has transmitted the request message.

Each of the discrimination devices 30a and 30b and each of the data retrievers 40a and 40b acts as a relay device relaying the request message.

Each of the discrimination devices 30a and 30b connects to the data retrievers 40a and 40b via a network.

The discrimination devices 30a and 30b have the same function.

For example, upon receiving the request message from the load balancer 20, the discrimination device 30a discriminates a destination server device among the server devices 50a to 50e and a source client device among the client devices 10a and 10b in accordance with the message.

The discrimination device 30a determines a data retriever, out of the data retrievers 40a and 40b, to which a request message including a discrimination result is transmitted.

The discrimination device 30a transmits the request message including the discrimination result to the determined data retriever.

Each of the data retrievers 40a and 40b connects to the server devices 50a to 50e via a network.

The data retrievers 40a and 40b have the same function.

For example, upon receiving the request message including the discrimination result from the discrimination device 30a, the data retriever 40a determines a destination server device in accordance with the discrimination result included in the request message.

The data retriever 40a transmits the request message to the determined server device.

Upon receiving transfer rules from the transfer rule generation device 60, the data retriever 40a stores the transfer rules in a predetermined position.

The stored transfer rules are used to determine a destination server device upon receiving the request message.

Each of the server devices 50a to 50e connects to the transfer rule generation device 60 via a network.

Upon processing in accordance with the received request message, each of the server devices 50a to 50e transmits a response to the client device 10a or 10b via the load balancer 20.

Each of the server devices 50a to 50e determines, in accordance with information contained in the received request message, whether there is a cache of data (referred to as user data) capable of identifying a user who operates the client device 10a or 10b.

When there is no cache of the user data, the server device generates a cache of the user data. Upon generating the cache of the user data, the server device notifies the transfer rule generation device 60 of information for generating a transfer rule including the cache.

The transfer rule generation device 60 connects to the data retrievers 40a and 40b via a network.

The transfer rule generation device 60 generates a transfer rule in accordance with the information, received from one of the server devices 50a to 50e, for generating a transfer rule.

The transfer rule generation device 60 determines, in accordance with the information for generating a transfer rule, on which of the data retrievers 40a and 40b to set the generated transfer rule.

The transfer rule generation device 60 transmits the generated transfer rule to the determined data retriever.

A hardware configuration of the discrimination device 30a will be discussed.

Figure 3:
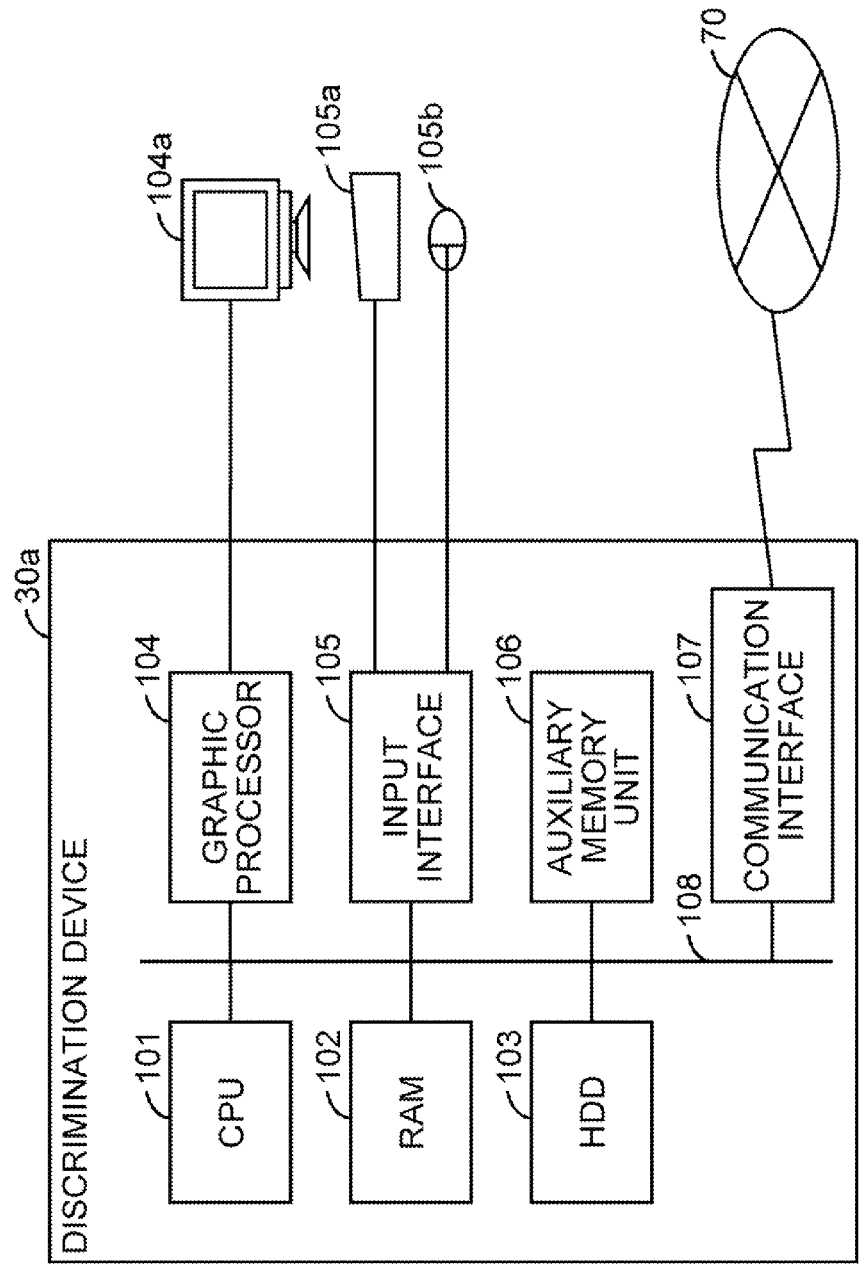
FIG. 3 is a diagram illustrating an example of a hardware configuration of a discrimination device according to an embodiment of the present invention.

FIG. 3 is a diagram illustrating an example of a hardware configuration of a discrimination device according to an embodiment of the present invention.

The discrimination device 30a includes a central processing unit (CPU) 101, a random access memory (RAM) 102, a hard disk drive (HDD) 103, a graphic processor 104, an input interface 105, an auxiliary memory unit 106, and a communication interface 107. These components connect to each other via a bus 108.

The CPU 101 controls the entire discrimination device 30a.

The RAM 102 temporarily stores at least a part of programs of an operating system (OS) and application programs executed by the CPU 101. The RAM 102 also stores various data required for processing by the CPU 101.

The HDD 103 stores the OS and the application programs. The HDD 103 also stores program files.

The graphic processor 104 connects to a monitor 104a. The graphic processor 104 displays an image on a screen of the monitor 104a in accordance with an instruction from the CPU 101.

The input interface 105 connects to a keyboard 105a and a mouse 105b. The input interface 105 sends signals sent from the keyboard 105a or the mouse 105b to the CPU 101 via the bus 108.

The auxiliary memory unit 106 reads and writes information to and from a recording medium. Examples of the recording medium to and from which the auxiliary memory unit 106 writes and reads include a magnetic recording device, an optical disk, a magneto-optical recording medium, and a semiconductor memory. Examples of the magnetic recording device include an HDD, a flexible disk (FD), and a magnetic tape. Examples of the optical disk include a digital versatile disc (DVD), a DVD-RAM, a compact disc read-only memory (CD-ROM), a compact disc recordable (CD-R), and a compact disc rewritable (CD-RW). Examples of the magneto-optical recording medium include a magneto-optical disk (MO).

The communication interface 107 connects to a network 70. The communication interface 107 transmits and receives data to and from other computers and devices via the network 70.

The above hardware configuration provides the functions of the embodiments. While FIG. 3 illustrates the hardware configuration of the discrimination device 30a, the identical hardware configuration may achieve the discrimination device 30b, the data retrievers 40a and 40b, and the transfer rule generation device 60.

The thus-configured discrimination devices 30a and 30b, data retrievers 40a and 40b, and transfer rule generation device 60 are respectively provided with functions below.

Figure 4:
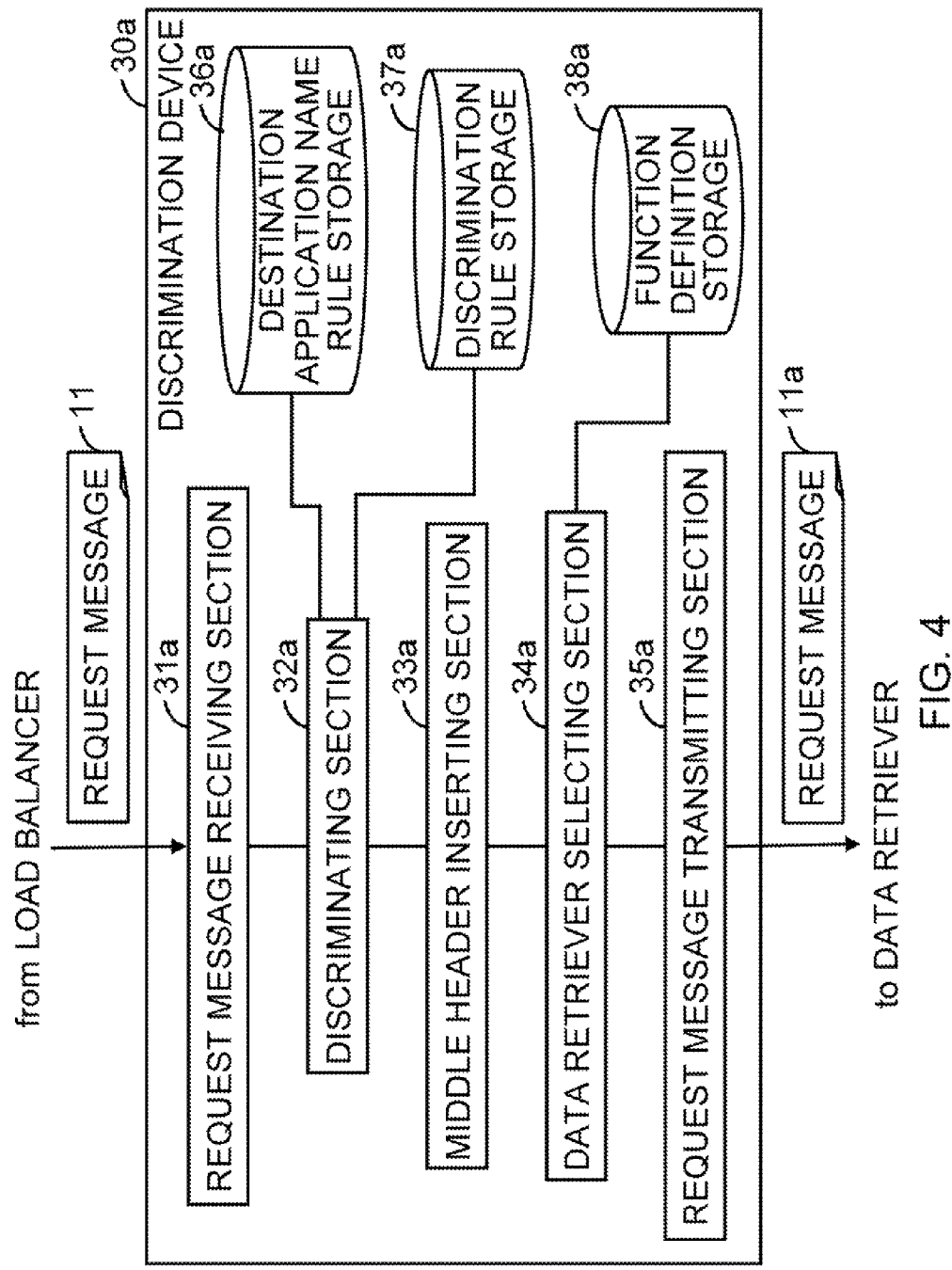
FIG. 4 is a diagram illustrating functions of a discrimination device according to an embodiment of the present invention.

FIG. 4 is a diagram illustrating functions of a discrimination device according to an embodiment of the present invention.

The discrimination device 30a includes a request message receiving section 31a, a discriminating section 32a, a middle header inserting section 33a, a data retriever selecting section 34a, a request message transmitting section 35a, a destination application name rule storage 36a, a discrimination rule storage 37a, and a function definition storage 38a.

The request message receiving section 31a receives a request message 11 from the load balancer 20. The request message receiving section 31a sends the received request message 11 to the discriminating section 32a.

FIG. 5 is a diagram illustrating an example of a request message transmitted from a client device according to an embodiment of the present invention.

In FIG. 5, an example of a SOAP over hypertext transfer protocol (SOAPoverHTTP) request message is provided as the request message 11.

The request message 11 includes an Internet protocol (IP) header 111, a transmission control protocol (TCP) header 112, a layer-7 protocol header 113, and a message content 114.

In the example, the request message 11 includes an HTTP header as the layer-7 protocol header 113. In the example, the message content 114 has an SOAP header.

The HTTP header includes, for example, information (referred to as a destination application name) "/services/A1" specifying an application program executed by the server device 50a.

The SOAP header includes an identifier "sip:bob@example.com" capable of identifying a user who operates the client device 10a.

Referring back to FIG. 4, the discriminating section 32a refers to destination application name rules stored in the destination application name rule storage 36a and discrimination rules stored in the discrimination rule storage 37a.

The discriminating section 32a discriminates and extracts information (referred to as a destination application name) capable of identifying the application program stored in one of the server devices 50a to 50e and an identifier thereof from the received request message 11 in accordance with the destination application name rules and the discrimination rules. The process of discriminating and extracting the destination application name and the identifier is referred to as a discrimination process.

The discriminating section 32a sends, to the middle header inserting section 33a, the extracted destination application name and the identifier together with the request message 11.

The middle header inserting section 33a inserts the destination application name and the identifier extracted by the discriminating section 32a before the layer-7 protocol header 113 of the request message 11 as a middle header. The request message 11 inserted with the middle header is referred to as a request message 11a.

The data retriever selecting section 34a determines a destination data retriever out of the data retrievers 40a and 40b in accordance with a next hop determination function F(x) stored in the function definition storage 38a.

The request message transmitting section 35a transmits the request message 11a to the data retriever 40a or 40b determined by the data retriever selecting section 34a.

The request message 11a transmitted by the discrimination device 30a will be discussed.

FIG. 6 is a diagram illustrating an example of a request message transmitted from a discrimination device according to an embodiment of the present invention.

The request message 11a includes a middle header 115 inserted before the layer-7 protocol header 113, as discussed above.

The middle header 115 includes the destination application name and the identifier extracted by the discriminating section 32a, as discussed above. In the example illustrated in FIG. 6, the middle header 115 includes the destination application name "/services/A1" extracted from the layer-7 protocol header 113 and the identifier "sip:bob@example.com" extracted from the message content 114.

Next, information included in the destination application name rule storage 36a will be discussed.

FIG. 7 is a diagram illustrating an example of a destination application name rule according to an embodiment of the present invention.

The destination application name rule storage 36a stores the destination application name rules in tabular form.

A record, which corresponds to a rule, of a destination application name rule table 361a includes a "Protocol No." field, a "Port No." field, a "Message Format" field, an "Extraction Area" field, and a "Form of Extraction Area" field, associated with each other.

The "Protocol No." field contains a protocol number capable of identifying a type of an IP packet to be transferred. In FIG. 7, the "Protocol No." field contains "6". Accordingly, in accordance with this rule, a destination application name is extracted from a request message 11 in which an IP packet to be transferred is in a TCP protocol format.

The "Port No." field contains a port number capable of identifying a service. In FIG. 7, the "Port No." field contains "8080". Accordingly, in accordance with this rule, the destination application name is extracted from a request message 11 that accesses a port with a port number 8080.

The "Message Format" field contains information capable of identifying a format of a request message 11. In FIG. 7, the "Message Format" field contains "HTTP". Accordingly, in accordance with this rule, the destination application name is extracted from a request message 11 in an HTTP format.

The "Extraction Area" field contains information capable of identifying an area from which the destination application name is extracted in accordance with information contained in the "Message Format" field.

In FIG. 7, the "Extraction Area" field contains "Request-URI". The "Message Format" field contains "HTTP", as discussed above.

Accordingly, in accordance with this rule, for the request message 11 illustrated in FIG. 5, "/services/A1", which is the request uniform resource identifier (URI) in "HTTP/1.1/services/A1\r\n", is extracted as a destination application name.

The "Form of Extraction Area" field contains information capable of identifying a form of an extraction area. In FIG. 7, the "Form of Extraction Area" field contains "HTTP Header Field Name". Accordingly, in accordance with this rule, for the request message 11 illustrated in FIG. 5, the destination application name is extracted from the HTTP Header Field Name.

Next, information stored in the discrimination rule storage 37a will be discussed.

FIG. 8 is a diagram illustrating an example of a discrimination rule according to an embodiment of the present invention.

The discrimination rule storage 37a stores the discrimination rules in tabular form.

A record, which corresponds to a rule, of a discrimination rule table 371a includes a "Destination Application Name" field, a "Message Format" field, an "Extraction Area" field, and a "Form of Extraction Area" field associated with each other.

The "Destination Application Name" field contains information capable of identifying an application program executed by the server device 50a or 50b. In FIG. 8, the "Destination Application Name" field contains "/services/A1". Accordingly, in accordance with this rule, an identifier is extracted from a request message 11 including "/services/A1" as the destination application name.

The "Message Format" field contains information capable of identifying a format of a message content 114. In FIG. 8, the "Message Format" field contains "SOAP". Accordingly, in accordance with this rule, the identifier is extracted from a request message 11 in a SOAP format.

The "Extraction Area" field contains information capable of identifying a site in which the identifier is extracted. In FIG. 8, the "Extraction Area" field contains "//presentity". Accordingly, in accordance with this rule, for the request message 11 illustrated in FIG. 5, the identifier is extracted from the portion between <Presentity> tags.

The "Form of Extraction Area" field contains information capable of identifying a format of an extraction area. In FIG. 8, the "Form of Extraction Area" field contains "Xpath".

Next, information stored in the function definition storage 38a will be discussed.

FIG. 9 is a diagram illustrating an example of information stored in a function definition storage according to an embodiment of the present invention.

In the example illustrated in FIG. 9, the function definition storage 38a stores a function definition 381a that is a definition of the next hop determination function F(x).

Details of the function definition 381a of the next hop determination function are as follows:

"F(x)=G(H(x)%N)" expresses calculation of "F(x)", wherein "(H(x)%N)" represents a remainder left when H(x) is divided by N.

Since "x=identifier", an identifier obtained by an discrimination process is substituted into a parameter x.

MD5 is a hash function (message digest).

Since "H(x)=MD5", an MD5 hash of the identifier is calculated.

Since "N=100", obtained is a remainder left when the calculation result of the MD5 hash is divided by 100.

Since a dependent table is specified by "G(x)=Table1", the dependent table, Table1, is searched using the obtained remainder as a key.

Although the identifier is used as the parameter x of the next hop determination function F(x) in the example illustrated in FIG. 9, the parameter x is not limited thereto; the destination application name or a concatenation of the destination application name and the identifier may be used. However, the parameter x should be determined in advance (statistically).

Next, the dependent table will be discussed.

FIG. 10 is a diagram illustrating an example of a dependent table according to an embodiment of the present invention.

A dependent table 382a has one or more tables. Each table has a name (for example, "Table1" in FIG. 10) capable of identifying the table. Each table also has a "Key Value" field and an "Address" field.

The "Key Value" field contains a possible value as the remainder of division by N.

FIG. 10 illustrates the dependent table 382a corresponding to "G(x)=Table1" in the function definition 381a of the next hop determination function illustrated in FIG. 9. Accordingly, remainders 0 to 99 that may be obtained by dividing the calculation result of the MD5 hash by 100 are set.

The "Address" field contains an address of a destination data retriever corresponding to the respective key values.

In FIG. 10, for example, an "Address" field corresponding to an even number of the key value contains an address "10.10.10.10:9999" of the data retriever 40a; and a "Address" field corresponding to an odd number of the key value contains an address "10.10.10.11:9999" of the data retriever 40b.

Thus, in this embodiment, the data retriever selecting section 34a determines a data retriever in accordance with the identifier. Accordingly, request messages 11a including the same destination application name and the same destination address may be transmitted to different data retrievers if they have different key values.

Next, functions of the data retriever 40a will be discussed.

FIG. 11 is a diagram illustrating functions of a data retriever according to an embodiment of the present invention.

The data retriever 40a includes a request message receiving section 41a, a middle header parsing section 42a, a destination determining section 43a, a middle header deleting section 44a, a request message transmitting section 45a, a transfer rule retrieving section 46a, an initial address determining section 47a, a transfer rule storage 48a, an endpoint list storage 49a, and a transfer rule receiving section 51a.

The request message receiving section 41a receives a request message 11a from the discrimination device 30a or the discrimination device 30b. The request message receiving section 41a sends the received request message 11a to the middle header parsing section 42a.

The middle header parsing section 42a parses the middle header 115 of the received request message 11a to obtain a destination application name and an identifier. The middle header parsing section 42a sends the destination application name and the identifier to the destination determining section 43a.

The destination determining section 43a determines, in accordance with the destination application name and the identifier, a server device to which a request message 11b illustrated in FIG. 11 is to be transmitted.

The destination determining section 43a uses the transfer rule retrieving section 46a and the initial address determining section 47a to determine the destination server device.

The middle header deleting section 44a deletes the middle header 115 included in the request message 11a. Thus, the request message 11a comes to be identical to the request message 11. The request message from which the middle header 115 has been deleted (having an identical content to that of the request message 11) will be referred to as a request message 11b for the convenience of discussion.

The request message transmitting section 45a transmits the request message 11b to the destination server device determined by the destination determining section 43a.

The transfer rule retrieving section 46a determines, in response to a request from the destination determining section 43a, whether a destination address has been stored in the transfer rule storage 48a (retrieval process). The transfer rule retrieving section 46a returns the obtained retrieval result to the destination determining section 43a.

The transfer rule storage 48a stores transfer rules for determining the destination address of the request message 11b to be transmitted by the destination determining section 43a.

The initial address determining section 47a determines a destination address when the transfer rule retrieving section 46a has not obtained the destination address.

Specifically, the initial address determining section 47a retrieves the destination address from the endpoint list storage 49a. The initial address determining section 47a returns the obtained address to the destination determining section 43a.

Upon obtaining plural of addresses as the retrieval result, the initial address determining section 47a selects one of the addresses in accordance with a predetermined rule.

Upon receiving a transfer rule setup message 600, discussed below, from the transfer rule generation device 60, the transfer rule receiving section 51a sets up a transfer rule or cancels a transfer rule.

Specifically, the transfer rule receiving section 51a adds a transfer rule included in the received transfer rule setup message 600 to a transfer rule table stored in the transfer rule storage 48a. Alternatively, the transfer rule receiving section 51a deletes a transfer rule corresponding to the transfer rule included in the received transfer rule setup message 600, from the transfer rule table stored in the transfer rule storage 48a.

Upon setting the transfer rule, the transfer rule receiving section 51a returns an acknowledgement to the transfer rule generation device 60.

Thus, the data retriever 40a performs roughly classified two processes: the process of transmitting a request message to a server device and the process of setting a transfer rule.

Next, the information stored in the transfer rule storage 48a will be discussed.

FIG. 12 is a diagram illustrating an example of a transfer rule stored in a data retriever according to an embodiment of the present invention.

The transfer rule storage 48a of the data retriever 40a stores the transfer rules in tabular form.

A record, which corresponds to a rule, of a transfer rule table 481a includes a "Destination Application Name" field, an "Identifier" field, and a "Destination Address" field, associated with each other.

The "Destination Application Name" field contains information capable of identifying an application program to be executed by a destination server device.

The "Identifier" field contains information capable of identifying respective users who operate the client devices 10a and 10b.

The "Destination Address" field contains an address of a destination server device. In FIG. 12, for example, "host1.example.com:8080" is the address of the server device 50a; "host2.example.com:8080" is the address of the server device 50b; and "host3.example.com:8080" is the address of the server device 50c.

In this way, the transfer rule table 481a holds an address of a destination server device corresponding to a set of a destination application name and an identifier.

The relationship between an identifier and a destination server device is determined during operation. Therefore, the transfer rule is dynamically set on the transfer rule table 481a by the transfer rule generation device 60 when the server device executing the application program has determined the identifier.

The details of the method for setting a transfer rule will be discussed later.

Next, information stored in a transfer rule storage of a data retriever 40b will be discussed.

FIG. 13 is a diagram illustrating an example of a transfer rule stored in a data retriever according to an embodiment of the present invention.

The transfer rule storage of the data retriever 40b stores the transfer rules in tabular form.

A record, which corresponds to a rule, of a transfer rule table 481b includes a "Destination Application Name" field, an "Identifier" field, and a "Destination Address" field, associated with each other.

The items contained in respective fields are similar to those of the transfer rule table 481a. In FIG. 13, for example, "host4.example.com:8080" contained in the "Destination Address" field is the address of the server device 50d, and "host5.example.com:8080" is the address of the server device 50e.

The information stored in the transfer rule table 481b has no overlaps with the information stored in the transfer rule table 481a. This owes to the function of the transfer rule generation device 60, discussed below.

Next, information stored in the endpoint list storage 49a will be discussed.

FIG. 14 is a diagram illustrating an example of an endpoint list stored in a data retriever according to an embodiment of the present invention.

The endpoint list storage 49a stores the endpoint lists in tabular form.

An endpoint list table 491a includes a "Destination Application Name" field and a "Destination Address" field, associated with each other.

The "Destination Application Name" field contains information capable of identifying an application program to be executed by a destination server device.

The "Destination Address" field contains an address of a server device storing the application program to be executed by a destination server device.

The endpoint list table 491a has stored in advance addresses of all server devices that may execute the respective application programs identified with the destination application names. For example, FIG. 14 illustrates that the server devices 50a to 50d may execute the application program "/services/A1" specified in the request message 11a as the destination application name and that server devices 50a to 50e may execute the application program "/services/B2" specified in the request message 11a.

Next, the function of the transfer rule generation device 60 will be discussed.

Figure 15:
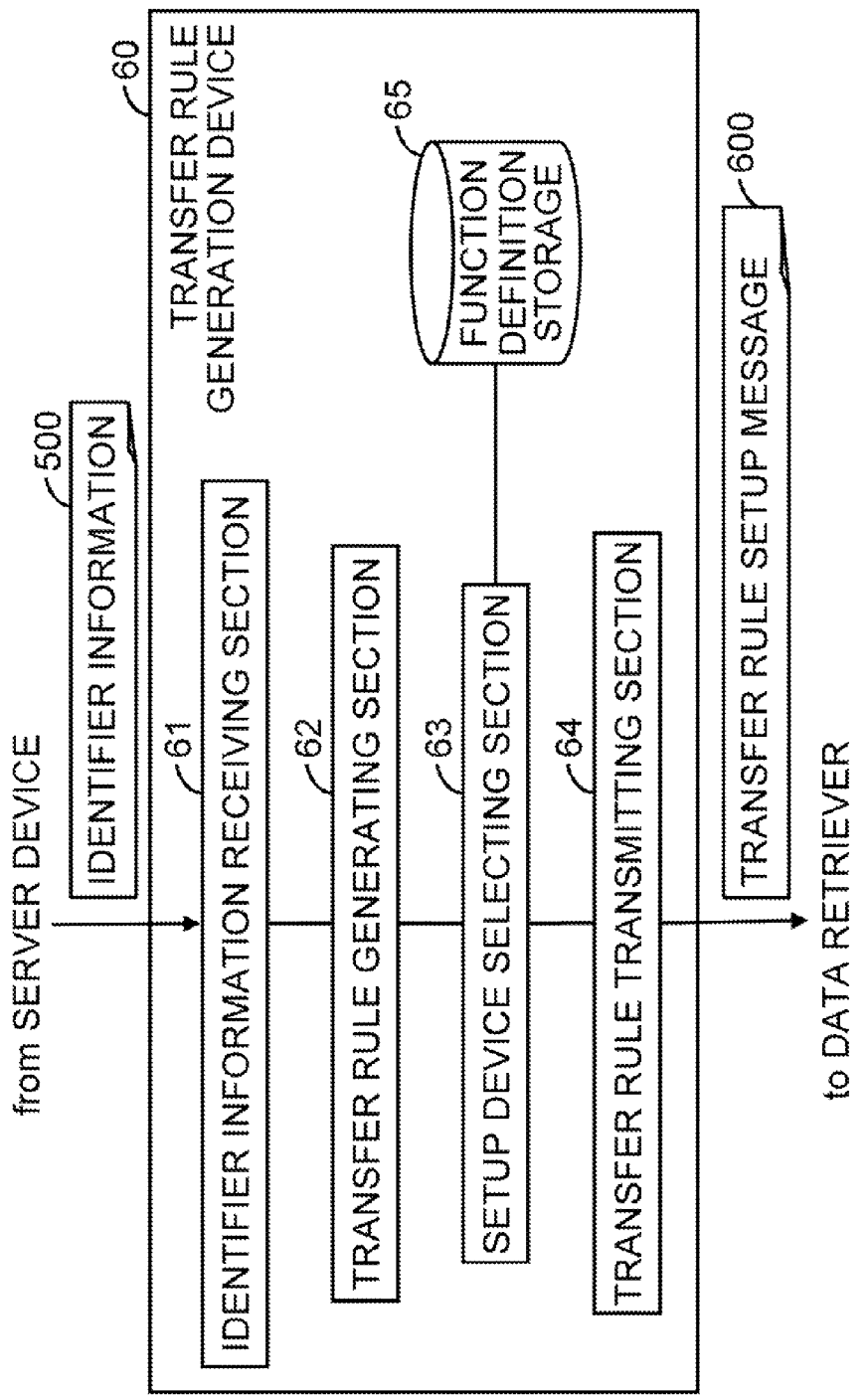
FIG. 15 is a diagram illustrating functions of a transfer rule generation device according to an embodiment of the present invention.

FIG. 15 is a diagram illustrating functions of a transfer rule generation device according to an embodiment of the present invention.

The transfer rule generation device 60 includes an identifier information receiving section 61, a transfer rule generating section 62, a setup device selecting section 63, a transfer rule transmitting section 64, and a function definition storage 65.

The identifier information receiving section 61 receives identifier information 500 from one of the server devices 50a to 50e.

The identifier information 500 is information that each of the server devices 50a to 50e sends to the transfer rule generation device 60 in the case where a user data cache is absent when the each of the server devices 50a to 50e performs a process for a request.

The transfer rule generating section 62 holds information on the application programs stored in the respective server devices 50a to 50e and information on the port numbers corresponding to the respective application programs.

The transfer rule generating section 62 generates, in accordance with the information held therein and the identifier information 500 received by the identifier information receiving section 61, a transfer rule setup message 600 for transmitting the identifier information 500 to the data retriever 40a or 40b.

The setup device selecting section 63 selects, by using a table location determination function F(x), the data retriever 40a or 40b for which the transfer rule is to be set. The parameter x is the same parameter as the parameter x of the function definition 381a of the next hop determination function, that is, a destination application name, an identifier, or a concatenation of the destination application name and the identifier, for example.

The transfer rule transmitting section 64 transmits the transfer rule setup message 600 generated by the transfer rule generating section 62 to a destination server device selected by the setup device selecting section 63.

The function definition storage 65 stores the definition of the table location determination function F(x) for determining a destination data retriever. The table location determination function F(x) is the same as the next hop determination function F(x).

The use of the same function for the next hop determination function F(x) and the table location determination function F(x) ensures that the transfer rule for the request message 11a transmitted by the discrimination device 30a or 30b are present in the destination data retriever 40a or 40b.

Next, the identifier information 500 that the identifier information receiving section 61 receives will be discussed.

FIG. 16 is a diagram illustrating an example of identifier information according to an embodiment of the present invention.

The identifier information 500 includes a "Server Application Name" slot, an "Identifier" slot, and a "Server Address" slot.

The "Server Application Name" slot contains information capable of identifying a server application program executed by the server device that has transmitted the identifier information 500. In FIG. 16, the "Server Application Name" slot contains "/services/A1", which is a request URI.

The "Identifier" slot contains information capable of identifying the user of a client device that has requested the server device that has transmitted the identifier information 500 to perform a process.

The "Server Address" slot contains the address of the server device that has transmitted the identifier information 500.

Next, a transfer rule setup message 600 will be discussed.

FIG. 17 is a diagram illustrating an example of a transfer rule setup message according to an embodiment of the present invention.

The transfer rule setup message 600 includes a "Destination Application Name" slot, an "Identifier" slot, a "Destination Address" slot, and an "Operation" slot.

The "Destination Application Name" slot and the "Identifier" slot are similar to those of the "Server Application Name" slot and the "Identifier" slot of the identifier information 500.

The "Destination Address" slot contains the server address of the identifier information 500 with a port number added thereto. The destination address may be obtained as follows:

The transfer rule generating section 62 holds information on the application programs stored in the respective server devices 50a to 50e and information on the port numbers corresponding to the respective the application programs, as discussed above.

The transfer rule generating section 62 identifies the application program of the server device 50a, 50b, 50c, 50d, or 50e in accordance with the server address included in the identifier information 500 and the destination application name. The transfer rule generating section 62 identifies the port number for the identified application program with reference to the information held by the transfer rule generating section 62. The transfer rule generating section 62 adds the identified port number to the server address included in the identifier information 500.

The "Operation" slot contains information indicating whether the transfer rule is to be added to or deleted from the transfer rule table 481a. When the information is "addition", the transfer rule setup message 600 is to request to add the information to the transfer rule table 481a. When the information is "deletion", the transfer rule setup message 600 is to request to delete a rule corresponding to the information from the transfer rule table 481a.

Next, a dependent table 65a will be discussed.

FIG. 18 is a diagram illustrating an example of a dependent table according to an embodiment of the present invention.

A record of the dependent table 65a includes a "Key Value" field and an "Address" field.

The "Key Value" field contains a remainder that may be obtained by dividing the calculation result of MD5 hash.

FIG. 18 illustrates a dependent table 65a for the table location determination function of the same definition as the function definition 381a of the next hop determination function. Accordingly, remainders 0 to 99 that may be obtained by dividing the calculation of the MD5 hash by 100 are illustrated.

The "Address" field contains an address corresponding to the key value.

In FIG. 18, for example, the "Address" field corresponding to a Key Value of an even number contains an address "10.10.10.10:8888" of the data retriever 40a; and the "Address" field corresponding to a Key Value of an odd number contains an address "10.10.10.11:8888" of the data retriever 40b.

The port numbers of the address may not necessarily be the same as those of the dependent table 382a.

Next, the overall process of the system 100 will be discussed.

A first process of the system 100 is performed when destination information for the request message 11a has not been set in the transfer rule table 481a. A second process of the system 100 is performed when destination information for the request message 11a has been set in the transfer rule table 481a.

Figure 19:
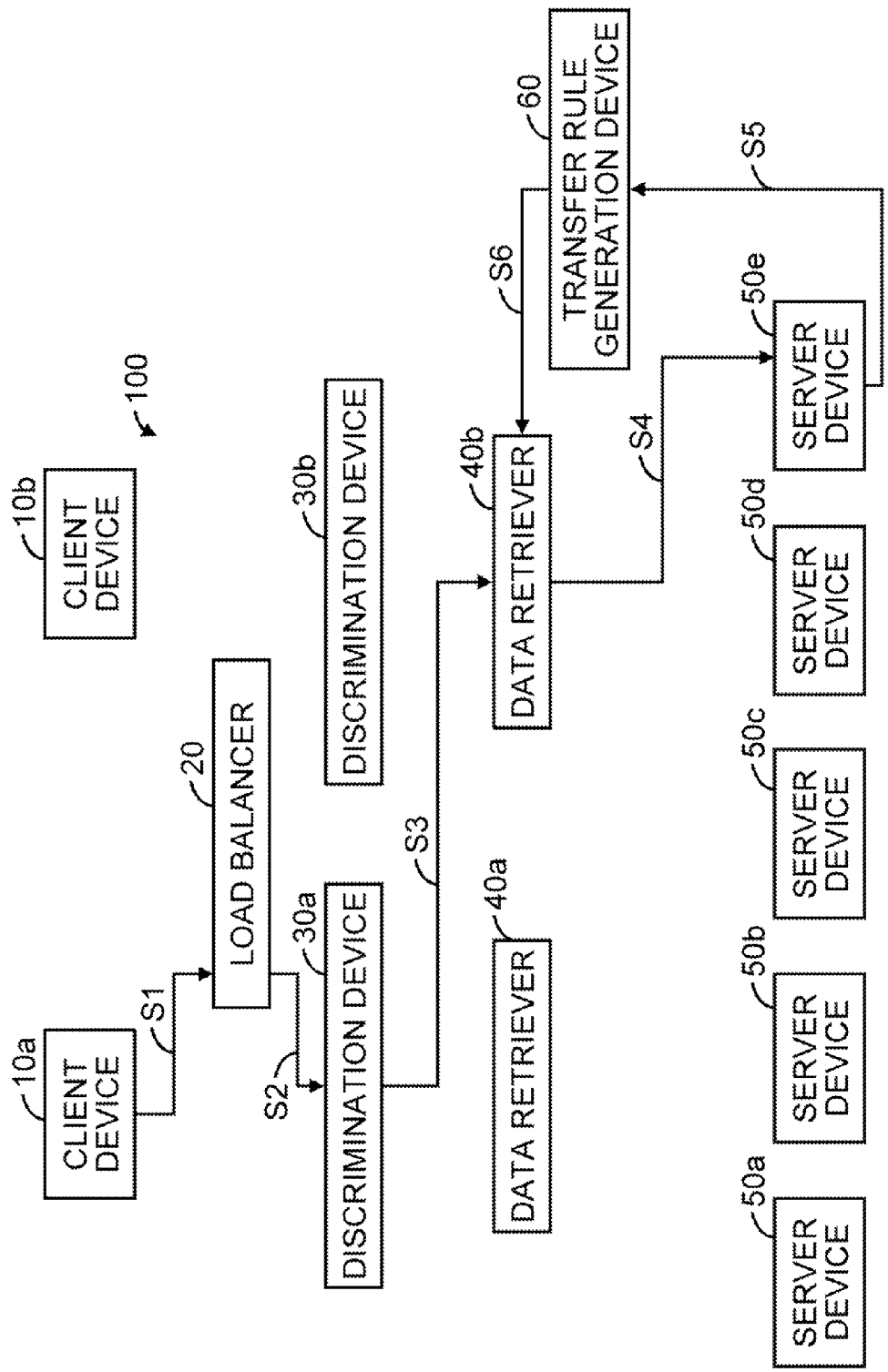
FIG. 19 is a diagram illustrating a first process of a system according to an embodiment of the present invention.

FIG. 19 is a diagram illustrating a first process of a system according to an embodiment of the present invention.

In operation S1, the client device 10a or the client device 10b (in FIG. 19, client device 10a) transmits the request message 11 illustrated in FIG. 5 to a server device storing a server application program.

The request message 11 transmitted from the client device 10a includes the network address of the load balancer 20 as a destination address. This causes the client device 10a to access a virtual server device assigned to the load balancer 20.

In operation S2, upon receiving the request message 11, the load balancer 20 determines, in accordance with a predefined load balancing algorithm, a transfer destination from among the discrimination devices 30a and 30b targeted to load distribution. The load balancer 20 transmits the request message 11 to the determined discrimination device (in FIG. 19, the discrimination device 30a).

In operation S3, upon receiving the request message 11, the discrimination device 30a performs the discrimination process. The discrimination device 30a determines, in accordance with the obtained identifier, a transfer destination from among the data retrievers 40a and 40b.

The discrimination device 30a adds the destination application name and the identifier to the request message 11 as the middle header 115 illustrated in FIG. 6 to generate the request message 11a illustrated in FIG. 4.

The discrimination device 30a transmits the request message 11a to the data retriever (in FIG. 19, the data retriever 40b) determined as the transfer destination.

In operation S4, upon receiving the request message 11a, the data retriever 40b obtains the destination application name and the identifier from the middle header 115 and searches the transfer rule table 481b by using the obtained destination application name and the identifier as keywords. Since the transfer rule table 481b has stored no transfer rules that match the keywords, the data retriever 40b determines a destination server device from among the server devices 50a to 50e targeted to load distribution.

The data retriever 40b then deletes the middle header 115 included in the request message 11a to generate the request message 11b illustrated in FIG. 11.

The data retriever 40b transmits the request message 11b to the server device determined as the destination server device (in FIG. 19, the server device 50e).

In operation S5, upon receiving the request message 11b, the server device 50e performs a request process. The server device 50e generates a new data cache of the user data during the request process.

The server device 50e notifies the transfer rule generation device 60 of the identifier information 500, illustrated in FIG. 15, for the generated user data cache.

In operation S6, the transfer rule generation device 60 generates a transfer rule in accordance with the identifier information 500 and determines, in accordance with the generated transfer rule, a transfer destination from among the data retrievers 40a and 40b.

Since the data retriever 40b transmitted the request message 11b to the server device 50e, the data retriever 40b is determined to be the transfer destination.

The transfer rule generation device 60 transmits the transfer rule setup message 600 illustrated in FIG. 15 to the determined data retriever 40b.

Upon receiving the transfer rule setup message 600, the data retriever 40b sets the transfer rule.

Figure 20:
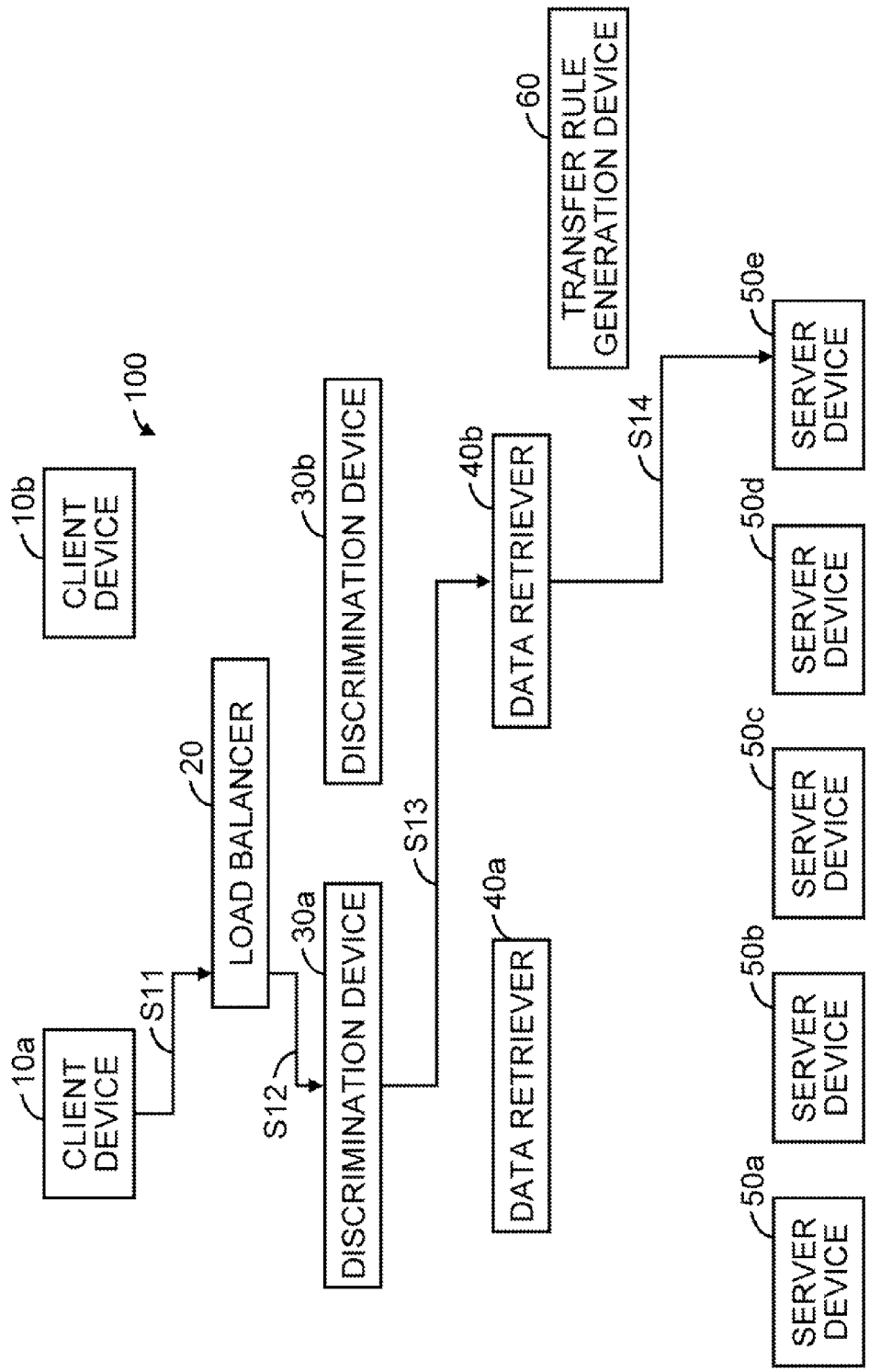
FIG. 20 is a diagram illustrating a second process of a system according to an embodiment of the present invention.

FIG. 20 is a diagram illustrating a second process of a system according to an embodiment of the present invention.

In operation S11, the client device 10a transmits the request message 11 illustrated in FIG. 5 to the same server device as in the first process. Similar to the case in the first process, the request message 11 transmitted from the client device 10a includes the network address of the load balancer 20 as a destination address.

In operation S12, upon receiving the request message 11, the load balancer 20 determines a transfer destination from among the discrimination devices 30a and 30b targeted to load distribution and transmits the request message 11 to the determined transfer destination.

In operation S13, upon receiving the request message 11, the discrimination device 30a performs the discrimination process and determines a data retriever as a transfer destination in accordance with the obtained identifier.

The discrimination device 30a adds the destination application name and the identifier to the request message 11 as the middle header 115 illustrated in FIG. 6 to generate the request message 11a illustrated in FIG. 4.

The discrimination device 30a transmits the request message 11a to the determined data retriever 40b.

In operation S14, upon receiving the request message 11a, the data retriever 40b obtains the destination application name and the identifier from the middle header 115 and searches the transfer rule table 481b by using the obtained destination application name and the identifier as keywords. The transfer rule table 481b has stored the entry of the corresponding transfer rule obtained in the first process. Thus, the address of the destination server device 50e may be obtained.

The data retriever 40b then deletes the middle header 115 included in the request message 11a to generate the request message 11b illustrated in FIG. 11.

The data retriever 40b transmits the request message 11b to the obtained address, that is, the server device 50e.

Upon receiving the request message 11b, the server device 50e performs a process in response to the request message 11b using the user data cache generated in the first process and returns the processing result to the client device 10a.

The server device 50e does not transmit the identifier information 500, illustrated in FIG. 15, to the transfer rule generation device 60 since the user data cache is present.

Next, the process of the discrimination device 30a and 30b in the first and second processes will be discussed in detail.

Figure 21:
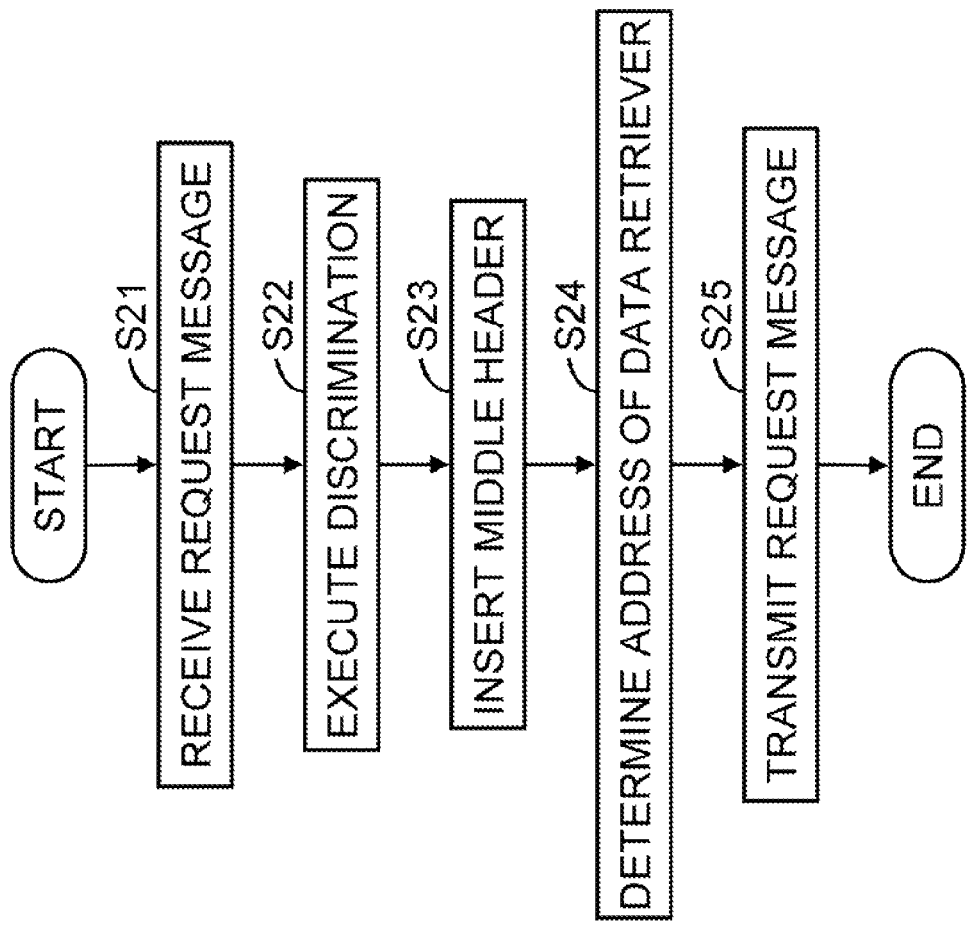
FIG. 21 is a diagram illustrating an example of a flowchart representing an operation flow of a discrimination device according to an embodiment of the present invention.

FIG. 21 is a diagram illustrating an example of a flowchart representing an operation flow of a discrimination device according to an embodiment of the present invention.

In operation S21, the request message receiving section 31a receives the request message 11. The request message receiving section 31a sends the received request message 11 to the discriminating section 32a.

In operation S22, the discriminating section 32a extracts the destination application name and the identifier included in the request message 11.

In extraction of the destination application name, the discriminating section 32a refers to the destination application name rule table 361a by using the protocol number and the port number included in the request message 11 as keywords. The discriminating section 32a determines the format of the target request message 11 and the extraction area thereof to extract the destination application name.

In extraction of the identifier, the discriminating section 32a refers to the discrimination rule table 371a by using the destination application name as a keyword. The discriminating section 32a determines the format of the target request message 11 and the extraction area thereof to extract the identifier.

The discriminating section 32a transmits the request message 11 together with the obtained destination application name and the identifier to the middle header inserting section 33a.

In operation S23, the middle header inserting section 33a adds (inserts) the middle header 115 before the layer-7 protocol header 113 of the request message 11 to generate the request message 11a.

The middle header inserting section 33a transmits the request message 11a to the data retriever selecting section 34a.

In operation S24, the data retriever selecting section 34a determines a key value by substituting the identifier into the parameter x of the function definition 381a of the next hop determination function. The data retriever selecting section 34a then determines the address of the destination data retriever that matches the determined key value with reference to the dependent table 382a. The data retriever selecting section 34a transmits the request message 11a together with the determined address to the request message transmitting section 35a.

In operation S25, the request message transmitting section 35a transmits the received request message 11a to the received address.

Next, a method for determining the address of the destination data retriever in operation S24 will be discussed.

The details of the process of the data retriever selecting section 34a when the function definition 381a, illustrated in FIG. 9, of the next hop determination function has been defined will be discussed.

(1) Since "x=identifier", an identifier, for example, "sip:bob@example.com", obtained by the discrimination process is substituted into the parameter x.

(2) Since "H(x)=MD5", the MD5 hash of the identifier, "sip:bob@example.com" is calculated.

(3) Since "N=100", obtained is a remainder left when the calculation result of the MD5 hash is divided by 100. Assume that the value is 0.

(4) Since "G(x)=Table1", the dependent table 382a is designated as a dependent table. Therefore, Table1 of the dependent table 382a is searched by using the key value 0 as a key.

(5) As a result, the address "10.10.10.10:9999" with a key value 0 is obtained as F(x).

Next, the process of the data retriever 40a and 40b will be discussed.

Figure 22:
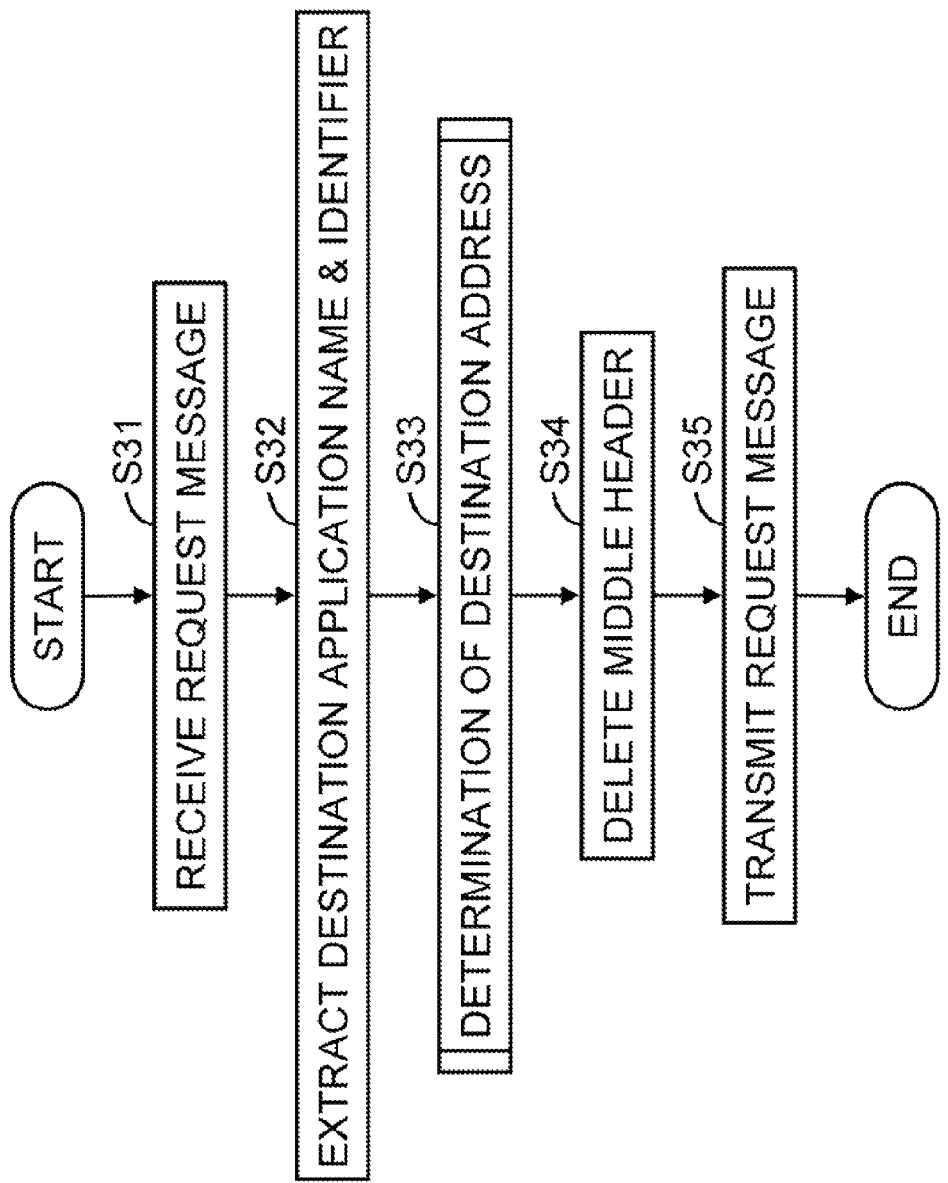
FIG. 22 is a diagram illustrating an example of a flowchart representing an operation flow of a data retriever according to an embodiment of the present invention.

FIG. 22 is a diagram illustrating an example of a flowchart representing an operation flow of a data retriever according to an embodiment of the present invention.

In operation S31, the request message receiving section 41a receives the request message 11a. The request message receiving section 41a transmits the received request message 11a to the middle header parsing section 42a.

In operation S32, the middle header parsing section 42a parses the middle header 115 to extract the destination application name and the identifier. The middle header parsing section 42a transmits the request message 11a together with the extracted destination application name and the identifier and to the destination determining section 43a.

In operation S33, the destination determining section 43a performs an address determination process to determine the address of the destination server device. The destination determining section 43a transmits the request message 11a together with the address of the determined destination server device to the middle header deleting section 44a. The details of the address determination process will be discussed later.

In operation S34, the middle header deleting section 44a deletes the middle header 115 from the request message 11a to generate the request message 11b. The middle header deleting section 44a transmits the request message 11b together with the destination address to the request message transmitting section 45a.

The request message 11b is identical to the request message 11 illustrated in FIG. 5, that is, the request message 11 transmitted from the client device 10a.

In operation S35, the request message transmitting section 45a transmits the request message 11b to the destination address.

Next, the address determination process in operation S33 will be discussed.

Figure 23:
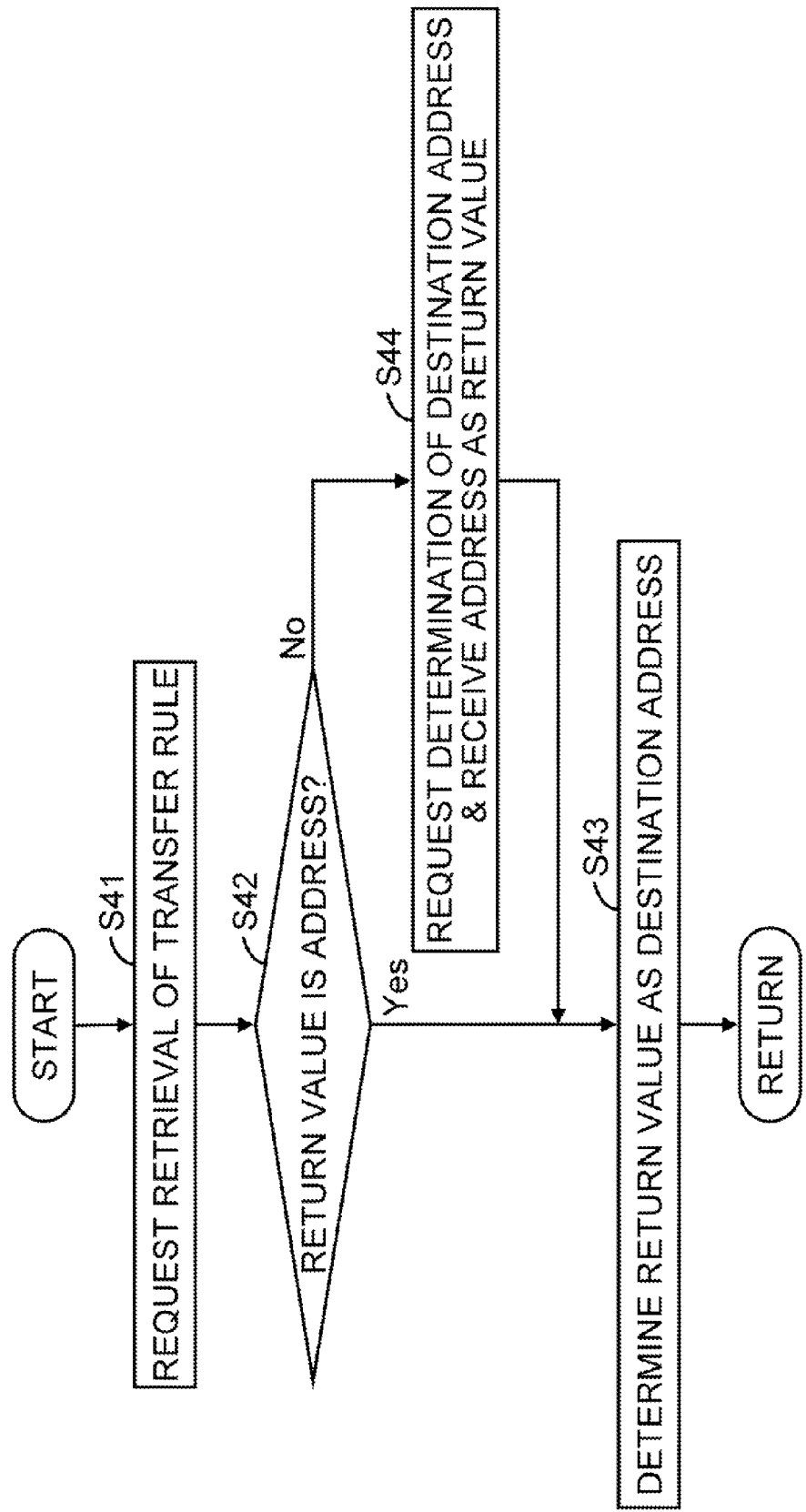
FIG. 23 is a diagram illustrating an example of a flowchart representing an operation flow of an address determination process according to an embodiment of the present invention.

FIG. 23 is a diagram illustrating an example of a flowchart representing an operation flow of an address determination process according to an embodiment of the present invention.

In operation S41, upon receiving the request message 11a together with the destination application name and the identifier from the middle header parsing section 42a, the destination determining section 43a passes the received destination application name and the identifier to the transfer rule retrieving section 46a to request retrieval of the transfer rule. The transfer rule retrieving section 46a searches the transfer rule table 481a by using the destination application name and the identifier as keywords. The return value from the transfer rule retrieving section 46a is a destination address or null.

In operation S42, the destination determining section 43a determines whether the return value is an address.

In operation S43, when the return value is an address ("Yes" in operation S42), the destination determining section 43a determines the obtained address as a destination address.

In operation S44, when the return value is not an address ("No" in operation S42), the destination determining section 43a passes the destination application name to the initial address determining section 47a to request determination of a destination address. The initial address determining section 47a searches the endpoint list table 491a by using the destination application name as a keyword. Plural of addresses may be obtained in the search using the destination application name as a keyword. The initial address determining section 47a autonomously selects one address from the obtained addresses and returns the selected address to the destination determining section 43a as a destination address. As a result, the destination determining section 43a receives the destination address as a return value.

The destination determining section 43a determines, in operation S43, the address obtained in operation S44 as a destination address.

Next, the process of receiving the transfer rule setup message 600 will be discussed.

First, the transfer rule generating process performed by the transfer rule generation device 60 will be discussed.

Figure 24:
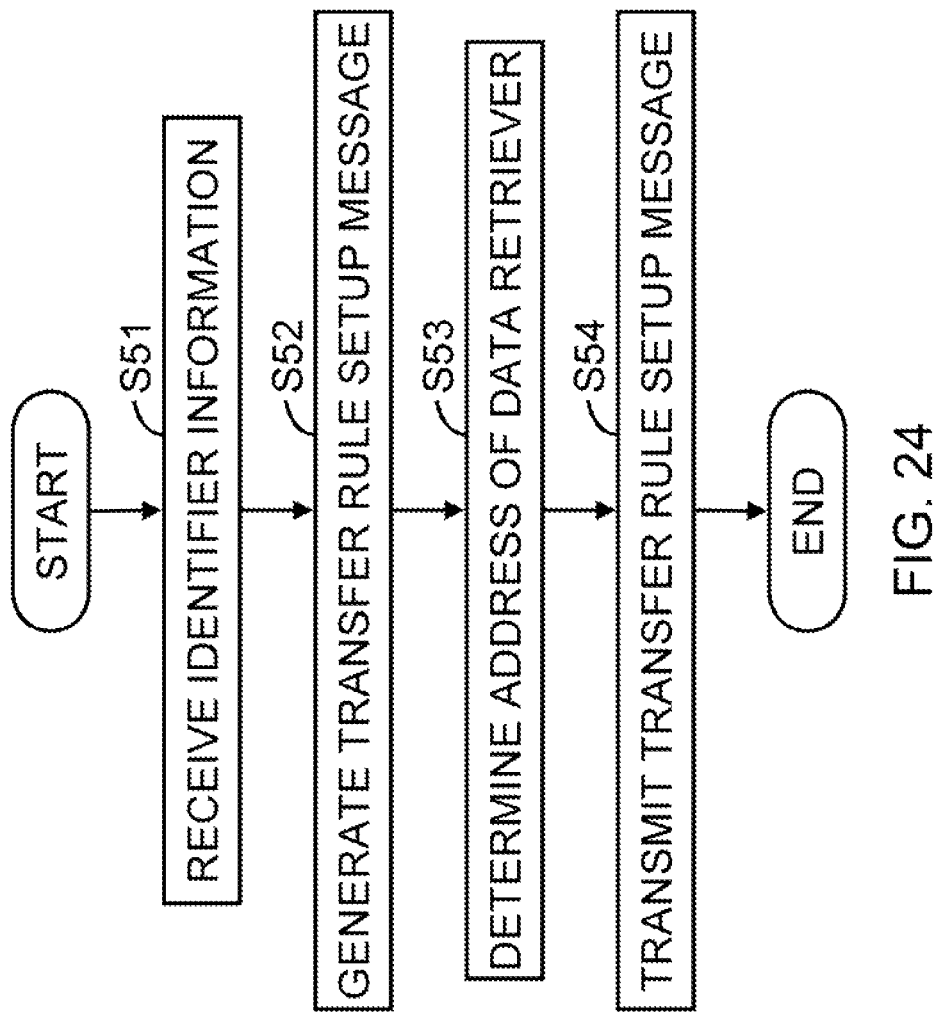
FIG. 24 is a diagram illustrating an example of a flowchart representing an operation flow of a transfer rule generating process according to an embodiment of the present invention.

FIG. 24 is a diagram illustrating an example of a flowchart representing an operation flow of a transfer rule generating process according to an embodiment of the present invention.

In operation S51, the identifier information receiving section 61 receives the identifier information 500 from a server device that has processed the request message 11b.

In operation S52, the transfer rule generating section 62 generates the transfer rule setup message 600 in accordance with the received identifier information 500.

In operation S53, the setup device selecting section 63 refers to the function definition of the table location determination function stored in the function definition storage 65 to determine the address of the data retriever in which the transfer rule is to be set.

The setup device selecting section 63 uses, as the function definition of the table location determination function, the same function definition 381a of the next hop determination function used in FIG. 21. The setup device selecting section 63 may use a dependent table such as illustrated in FIG. 18, similar to the case of the function definition 381a of the next hop determination function.

In operation S54, the transfer rule transmitting section 64 transmits the transfer rule setup message 600 to the address determined by the setup device selecting section 63.

Next, a transfer rule setup process performed by the data retriever 40a upon receiving the transfer rule setup message 600 will be discussed.

Figure 25:
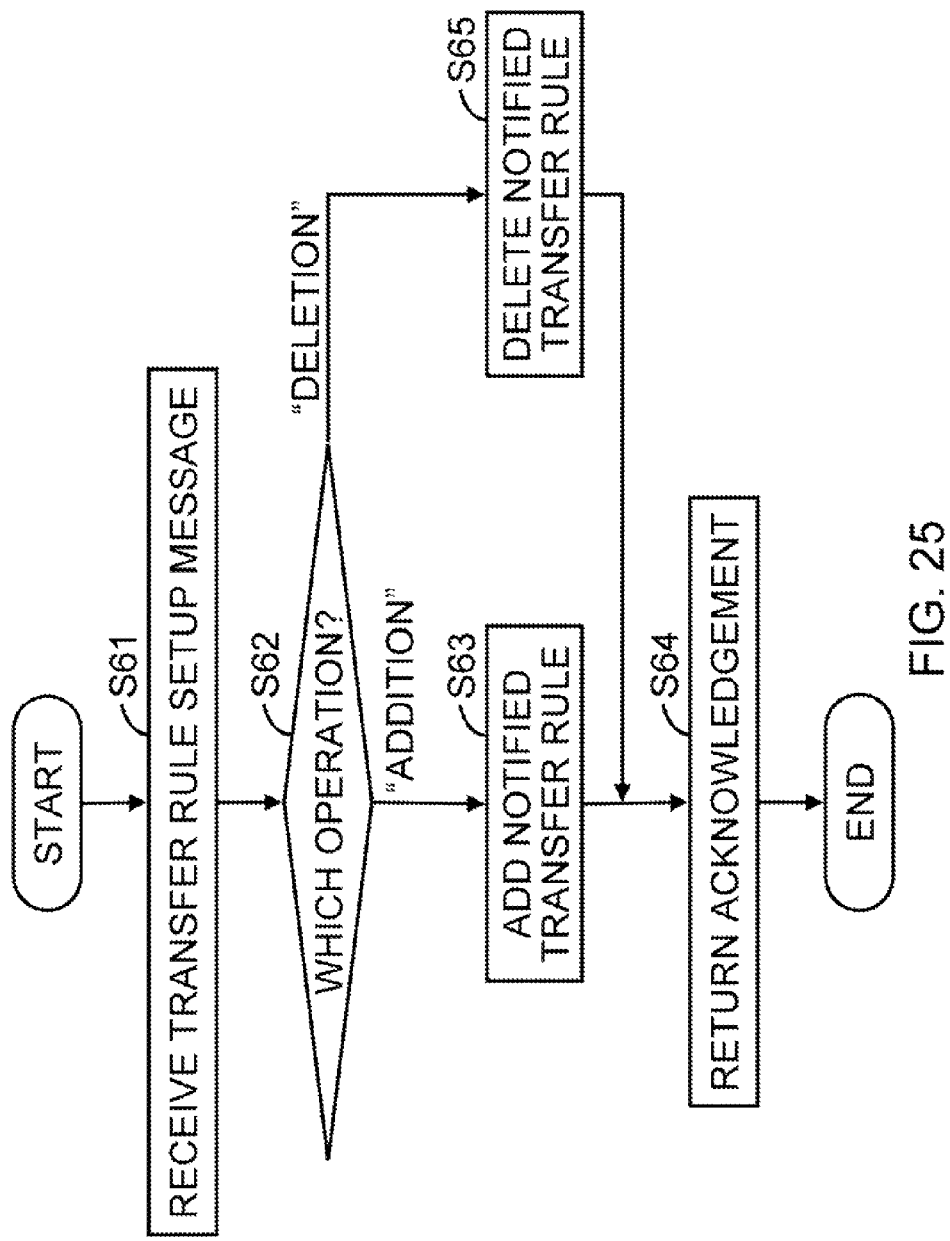
FIG. 25 is a diagram illustrating an example of a flowchart representing an operation flow of a transfer rule setup process according to an embodiment of the present invention.

FIG. 25 is a diagram illustrating an example of a flowchart representing an operation flow of a transfer rule setup process according to an embodiment of the present invention.

In operation S61, the transfer rule receiving section 51a receives the transfer rule setup message 600.

In operation S62, the transfer rule receiving section 51a determines an operation in accordance with the information contained in the "Operation" slot of the transfer rule setup message 600.

In operation S63, when the operation is determined to be addition ("ADDITION" in operation S62), the transfer rule receiving section 51a adds the transfer rule as a new entry of the transfer rule table 481a.

In operation S64, the transfer rule receiving section 51a returns an acknowledgement to the transfer rule generation device 60.

In operation S65, when the operation is determined to be delete ("DELETION" in operation S62), the transfer rule receiving section 51a deletes the transfer rule that matches the transfer rule setup message 600 from the transfer rule table 481a.

Thereafter, the transfer rule receiving section 51a returns an acknowledgement to the transfer rule generation device 60 in operation S64.

As discussed above, performing the discrimination process and the retrieval process in different units of the system 100 may reduce load on each data retriever.

Specifically, the system 100 is configured such that the data retriever selecting section 34a determines the data retriever 40a or 40b to be transmitted the request message 11a in accordance with an address obtained by substituting an identifier extracted from the request message 11 into the function definition 381a of the next hop determination function.

Accordingly, the request messages 11a having the same identifier are transmitted to the same data retriever.

The extracted identifier is set to the middle header 115 inserted into the original request message 11 to generate the request messages 11a.

The data retriever 40a or 40b need not to perform the discrimination process again but merely refer to the middle header 115.

The system 100 is configured such that when the transfer rule generation device 60 has received the identifier information 500, the setup device selecting section 63 determines the destination server device to which the transfer rule is to be sent, using the same table location determination function definition as the function definition 381a of the next hop determination function. This allows the transfer rule having the same identifier as that of the request message 11a to be transmitted to the same data retriever as that transmitted the request message 11a.

Upon receiving the transfer rule, the data retriever 40a or 40b stores the received transfer rule in the transfer rule storage 48a to use in the subsequent determination of destination server device.

For example, when the data retriever 40a has received a request message 11a including a middle header 115 having the same identifier as that in a middle header 115 of a request message 11a received previously, the destination address of the request message 11b may always be stored in the transfer rule table 481a. This allows the data retriever 40a to transmit quickly the request message 11b to the destination server device, since the transfer rule table 481a stores less data than the endpoint list table 491a.

While the apparatus, program, and method for processing data according to embodiments of the present invention have been discussed with reference to the drawings, embodiments of the present invention are not limited thereto; the configurations of the components may be replaced with any other configurations having the same functions. Furthermore, any other components or processes may be added to embodiments of the present invention.

Any two or more configurations (characteristics) of the above embodiments may be combined.

The functions discussed above may be achieved on a computer. In that case, programs describing the operations of the discrimination devices 30a and 30b and the data retrievers 40a and 40b may be provided. By executing the program by a computer, the functions are achieved on the computer. The program describing the operations may be stored in a non-transitory computer-readable recording medium. Examples of the non-transitory computer-readable recording medium include a magnetic recording device, an optical disk, a magneto-optical recording medium, and a semiconductor memory. Examples of the magnetic recording device include an HDD, an FD, and a magnetic tape. Examples of the optical disk include a DVD, a DVD-RAM, a CD-ROM, and a CD-R/RW. Examples of the magneto-optical recording medium include an MO.

For distribution of the program, portable recording media, such as a DVD and a CD-ROM, in which the program is recorded, are sold. Alternatively, the program stored in a storage unit of a server computer may be transferred from the server computer to another computer via a network.

A computer that executes a data processing program stores the program recorded in a portable recording medium or transferred from the server computer in its own memory unit. The computer reads the program from the memory unit and executes a process in accordance with the program. The computer may also read the program directly from the portable recording medium and execute the process in accordance with the program. The computer may also execute processes in accordance with a program every time the program has been transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay system, comprising:
a first hardware processor including:
a receiving unit to receive data transmitted from a client computer to one of plural server computers,
a discriminating unit to extract destination information and source information from the received data, the destination information including information capable of identifying an application program by the one of the plural server computers, the source information being information on the client computer,
a middle header inserting unit to insert the extracted destination information and source information into the received data at a predetermined position to obtain augmented data,
a data retriever determining unit to determine a transfer destination, in accordance with the extracted information, by using a same table location determination function definition as a function definition of a next hop determination function, the transfer destination searching the one of the plural server computers, the next hop determination function being expressed as $F(x)=G(H(x) \% N)$, x representing data obtained based on the extracted information, $H(x)$ representing a hash function, N representing a predetermined number, $H(x)\%N$ representing a remainder left when $H(x)$ is divided by N, $G(x)$ representing a table searchable using the remainder as a key, and
a transmitting unit to transmit the augmented data to the determined transfer destination; and
at least one second processor each including:
a message receiving unit to receive the augmented data from the data processing device and extract the destination information and source information from the augmented data,
a destination determining unit to determine the one of the plural server computers in accordance with the extracted information,
a middle header deleting unit to delete the destination information and source information from the augmented data to obtain original data, and a transmitting unit to transmit the original data to the one of the plural server computers.

2. The relay system according to claim 1, wherein the source information includes information on a user who operates the client computer.

3. The relay system according to claim 1, wherein the data retriever determining unit determines the transfer destination in accordance with the source information.

4. The relay system according to claim 1, wherein the data retriever further includes
a transfer rule receiving unit to receive an address of the one of the plural server computers together with destination information and source information, and
a storage unit to store the received address in association with the destination information received by the transfer rule receiving unit and the source information received by the transfer rule receiving unit,
wherein
the destination determining unit determines, as an address of the one of the plural server computers, an address stored in the storage in association with source information matched with the source information received by the message receiving unit.

5. The relay system according to claim 4, wherein the transfer rule receiving unit receives source information identical with the source information received by the message receiving unit, together with the address of the one of the plural server computers and the destination information.

6. A non-transitory computer-readable recording medium storing a program causing a computer system to execute a relay method executed by a relay system including a data processing device and at least one data retrievers, the relay method comprising:
receiving, by the data processing device, data transmitted from a client computer to one of plural server computers;
extracting, by the data processing device, destination information and source information from the received data, the destination information including information capable of identifying an application program by the one of the plural server computers, the source information being information on the client computer;
inserting, by the data processing device, the extracted destination information and source information into the received data at a predetermined position to obtain augmented data;
determining, by the data processing device, a data retriever, in accordance with the extracted information, by using a same table location determination function definition as a function definition of a next hop determination function, the data retriever searching the one of the plural server computers, the next hop determination function being expressed as $F(x)=G(H(x)\%N)$, x representing data obtained based on the extracted information, $H(x)$ representing a hash function, N representing a predetermined number, $H(x)\%N$ representing a remainder left when $H(x)$ is divided by N, $G(x)$ representing a table searchable using the remainder as a key;
transmitting, by the data processing device, the augmented data to the determined data retriever;
receiving, by the determined data retriever, the augmented data from the data processing device;
extracting, by the determined data retriever, the destination information and source information from the augmented data;
determining, by the determined data retriever, the one of the plural server computers in accordance with the extracted information;
deleting, by the determined data retriever, the destination information and source information from the augmented data to obtain original data; and
transmitting, by the determined data retriever, the original data to the one of the plural server computers.

7. A method executed by a relay system including a data processing device and at least one data retrievers, the method comprising:
receiving, by the data processing device, data transmitted from a client computer to one of plural server computers;
extracting, by the data processing device, destination information and source information from the received data, the destination information including information capable of identifying an application program by the one of the plural server computers, the source information being information on the client computer;
inserting, by the data processing device, the extracted destination information and source information into the received data at a predetermined position to obtain augmented data;
determining, by the data processing device, a data retriever, in accordance with the extracted information, by using a same table location determination function definition as a function definition of a next hop determination function, the data retriever searching the one of the plural server computers, the next hop determination function being expressed as $F(x)=G(H(x)\%N)$, x representing data obtained based on the extracted information, $H(x)$ representing a hash function, N representing a predetermined number, $H(x)\%N$ representing a remainder left when $H(x)$ is divided by N, $G(x)$ representing a table searchable using the remainder as a key;
transmitting, by the data processing device, the augmented data to the determined data retriever;
receiving, by the determined data retriever, the augmented data from the data processing device;
extracting, by the determined data retriever, the destination information and source information from the augmented data;
determining, by the determined data retriever, the one of the plural server computers in accordance with the extracted information;
deleting, by the determined data retriever, the destination information and source information from the augmented data to obtain original data; and
transmitting, by the determined data retriever, the original data to the one of the plural server computers.

8. A relay system for transferring message data transmitted from a client computer to one of plural server computers, the relay system comprising:
a data processing device including:
a first memory that stores data of a discrimination rule used for extracting destination information and source information from the message data, and
a first processor that
receives the message data transmitted from the client computer,
extracts the destination information and source information from the received message data in accordance with the data of the discrimination rule, the destination information including information capable of identifying an application program by the one of the plural server computers, the source information being information on the client computer, inserts the extracted destination information and source information into the received message data at a predetermined position to obtain augmented message data, determines a transfer destination, in accordance with the extracted information, by using a same table location determination function definition as a function definition of a next hop determination function, the transfer destination searching the one of the plural server computers, the next hop determination function being expressed as $F(x)=G(H(x)\%N)$, x representing data obtained based on the extracted information, $H(x)$ representing a hash function, N representing a predetermined number, $H(x)\%N$ representing a remainder left when $H(x)$ is divided by N, $G(x)$ representing a table searchable using the remainder as a key, and transmits the augmented message data to the determined transfer destination; and at least one data retriever each including:

a second memory that stores data of a transfer rule used for determining the one of the plural server computers; and a second processor that receives the augmented message data from the data processing device a, extracts the destination information and source information from the augmented message data, determines the one of the plural server computers in accordance with the extracted information and the data of the transfer rule, deletes the destination information and source information from the augmented message data to obtain original message data, and transmits the original message data to the one of the plural server computers.

* * * * *